(12) United States Patent
Borromeo

(10) Patent No.: US 9,301,245 B2
(45) Date of Patent: Mar. 29, 2016

(54) TOLL PATH ROUTING PROTOCOL

(71) Applicant: QUALCOMM Incorporated, San Diego, CA (US)

(72) Inventor: Theodore J. Borromeo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/918,422

(22) Filed: Jun. 14, 2013

(65) Prior Publication Data
US 2014/0369257 A1  Dec. 18, 2014

(51) Int. Cl.
H04W 48/20 (2009.01)
H04W 48/18 (2009.01)
H04W 52/02 (2009.01)

(52) U.S. Cl.
CPC ............. *H04W 48/20* (2013.01); *H04W 48/18* (2013.01); *H04W 52/0209* (2013.01)

(58) Field of Classification Search
None
See application file for complete search history.

(56) References Cited

U.S. PATENT DOCUMENTS

| | | | |
|---|---|---|---|
| 8,060,125 B2 * | 11/2011 | Granlund et al. | 455/509 |
| 8,379,828 B2 | 2/2013 | Baluja et al. | |
| 2005/0239497 A1 * | 10/2005 | Bahl | H04W 88/06 455/552.1 |
| 2007/0149238 A1 * | 6/2007 | Das et al. | 455/522 |
| 2007/0208782 A1 * | 9/2007 | Carter | G06F 8/65 |
| 2009/0143070 A1 * | 6/2009 | Shu et al. | 455/450 |
| 2010/0091669 A1 * | 4/2010 | Liu et al. | 370/252 |
| 2010/0178919 A1 * | 7/2010 | Deepak | H04W 48/16 455/435.2 |
| 2011/0282928 A1 | 11/2011 | Ball et al. | |
| 2012/0036035 A1 | 2/2012 | Baluja et al. | |
| 2013/0051326 A1 * | 2/2013 | Jeyatharan et al. | 370/328 |
| 2013/0060653 A1 * | 3/2013 | Sharkey | 705/26.3 |
| 2013/0165083 A1 * | 6/2013 | Fighel et al. | 455/414.1 |

FOREIGN PATENT DOCUMENTS

| | | |
|---|---|---|
| EP | 1179246 A1 | 2/2002 |
| EP | 1753178 A1 | 2/2007 |
| WO | WO-2013078408 A1 | 5/2013 |

OTHER PUBLICATIONS

Bircher E., et al., "An Agent-Based Architecture for Service Discovery and Negotiation in Wireless Networks," 2004, 12 pages.

(Continued)

*Primary Examiner* — Gregory Sefcheck
*Assistant Examiner* — Rina Pancholi
(74) *Attorney, Agent, or Firm* — Holland & Hart LLP

(57) ABSTRACT

Methods, systems, and devices are provided for selecting a wireless access point from a plurality of access points operated by a plurality of wireless service providers, where each access point may be enabled to concurrently compete for a user's access. A wireless device may transmit and/or broadcast a request for communication service to several network access points, which may be access points associated with licensed- and unlicensed-spectrum network service. A wireless device may receive offers for service in response to a service request and select one of the offers based on one or several factors, which may include the power cost or battery life required to connect to a network access point associated with an offer. In some cases, a non-agent based scheme may be employed in which a wireless device may communicate directly, and may negotiate service with one or more access points. Other aspects, embodiments, and features are also claimed and described.

18 Claims, 18 Drawing Sheets

(56) References Cited

OTHER PUBLICATIONS

Niyato D., et al., "Competitive Pricing in Heterogeneous Wireless Access Networks: Issues and Approaches," IEEE Network, Nov./Dec. 2008, pp. 4-11.

ISA/EPO, International Search Report and Written Opinion of the International Searching Authority, Int'l App. No. PCT/US2014/040495, Oct. 22, 2014, European Patent Office, Rijswijk, NL, 16 pgs.
IPEA/EPO, Second Written Opinion of the International Preliminary Examining Authority, Int'l App. No. PCT/US2014/040495, May 8, 2015, European Patent Office, Munich, DE, 11 pgs.

* cited by examiner

TOLL PATH ROUTING PROTOCOL

TECHNICAL FIELD

The technology discussed below relates generally to wireless communication and more specifically to devices, systems, and methods that enable and provide scenarios for communication system components to communicate with other system components.

BACKGROUND

Owners of wireless devices, like smartphones and electronic tablets, have limited choice about the networks on which their devices operate. Generally, this is because each mobile device is tied to a particular licensed-spectrum cellular service provider. Presently, it is possible for a cellular phone user to alternate between a connection with a licensed-spectrum cellular service provider ("cellular network") and an unlicensed-spectrum wireless network, like a wireless local area network ("WLAN"; e.g., products based on the IEEE 802.11 family of standards, "WiFi").

In certain situations, a mobile device might be able to choose between connecting to a single, designated cellular network and a WiFi network to which the device has user permissions. For example, a smartphone might connect to a cellular network while the user is driving to work, and then the device might connect to the user's office-provided WiFi once the user arrives at work. It may be possible for some devices to select between a variety of WiFi networks for which the user must pay an agreed-upon price. Typically, the situations when a user has a choice of WiFi networks arise for captive or semi-captive users, such as users at an airport, train station, hotel, and the like. Most often, competition for the user's access occurs within a single wireless access technology, like WiFi, and users typically pay a flat fee for access (e.g., a flat fee for a day of use) that may not reflect current market conditions or resources required to connect to a given wireless access point.

Competition among wireless communications service providers currently may be limited to different WiFi networks and a user's initial choice of cellular service provider. A determination of which cellular service provider to connect to may not be made in real time with a user's dynamic data requirement; it may be limited to a user's decision of which phone or SIM card to purchase. The fees a user pays for access to a particular network may not reflect a competitive market environment, which may be a result of a limited number of providers that are capable of competing for a user's access at a particular time.

BRIEF SUMMARY OF SOME SAMPLE EMBODIMENTS

Methods, systems, and devices for requesting, transmitting, receiving, and selecting requests and competitive offers for communications service are provided in accordance with various embodiments. The methods, systems, and devices may provide for resolving issues associated with a user's inability to search for and/or request real-time offers for communications service, which reflect the market price for the user's intended communications. Additionally or alternatively, the methods, systems, and devices may provide for resolving a wireless access point's inability to search for and/or respond to a request from a user for real time offers for communications services, which reflect a market price for providing service for the user's intended communications.

The following summarizes some aspects of the present disclosure to provide a basic understanding of the discussed technology. This summary is not an extensive overview of all contemplated features of the disclosure, and is intended neither to indentify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some cases a wireless service auctioning system, which may be referred to as a toll path routing protocol ("TPRP"), may be employed on a mobile device, or user equipment (UE). TPRP may facilitate requesting, processing, and/or negotiating communication service with a network. TPRP may also be employed by wireless access points (AP). A TPRP-enabled UE may transmit a service request for communication service to TPRP-enabled APs. The service request may include: a data rate term, such as a preferred data transfer rate; a reliability term, such as a guaranteed minimum data transfer rate; and a price term, such as a maximum amount of money a user is willing to pay (e.g., based on an amount of data or time, etc.). The service request may include a preference term, which may include a user's designation of whether she or he prefers higher data rates or lower costs. In order to facilitate as many potential network connections as possible, a TPRP-enabled UE may be capable of communicating with TPRP-enabled APs associated with licensed-spectrum cellular service providers as well as TPRP-enabled APs using unlicensed spectrum (e.g., WiFi, etc.). A TPRP-enabled UE may also be capable of connecting to wired TPRP-enabled APs using a variety of wired network access connections (e.g., Ethernet, USB, and the like).

In response to a service request, a TPRP-enabled UE may receive offers to provide communications service. The TPRP-enabled UE may be equipped to process responsive bids or offers and accept one of the bids or offers. The TPRP-enabled UE may select an offer based in whole or part on the transmission power requirements and/or battery life implications of selecting the offer. The TPRP-enabled AP associated with the accepted bid or offer may facilitate or provide network access according to terms of the accepted bid or offer. The TPRP-enabled APs may be associated with licensed-spectrum cellular service providers, unlicensed-spectrum service providers, including WiFi APs, and/or wired APs.

TPRP may be employed on a UE, an AP, a computer server system, and/or a component device of any or all of these. A TPRP-enabled apparatus may request, receive, and evaluate received offers or bids. A TPRP-enabled apparatus may select one of the offers or bids and facilitate connection with a wireless network associated with the selected bid. TPRP may be implemented with varying degrees of user input—for example, setting preferences for evaluation of offers or bids may be performed by a user while other aspects of TPRP are performed automatically by a TPRP-enabled apparatus.

A TPRP-enabled apparatus may request and/or respond to requests by updating or refreshing previous requests or responses, which may occur automatically, or with user input. For example, a TPRP-enabled UE may seek to establish a connection with a TPRP-enabled AP, and then continue seeking offers or bids for communication service in order to achieve a service connection at a best available rate. Alternatively, a TPRP-enabled apparatus may transmit service requests at some pre-defined schedule.

In some embodiments, a method of accessing a network may employ TPRP. The method may include transmitting a service request for a communication service. The method may include receiving offers in response to the service request, where each offer may be associated with a communication service connection to a network access point. The method may also include selecting one of the offers based on a service metric, which may be a function of a price and a transmission power associated with each of the communication service connections.

In some cases, the method may involve facilitating the communication service connection between a user equipment and the network access point associated with the selected offer.

In some embodiments of the method, the transmission power may be power required for a user equipment to communicate via the respective communication service connections associated with each offer.

According to some embodiments of the method, the service metric may be a function of remaining battery power of a user equipment, in addition to the price and the transmission power associated with each of the respective communication service connections.

In some embodiments of the method, the transmission power may be power required for an access point to communicate via the respective communication service connections associated with each offer.

The method may include a service metric that determines, for each of the communication service offers, a price-equivalent of an effect on battery life of a user equipment battery. The price-equivalent may be based on an initial battery charge state.

In some cases, the service request of the method may include a requested data rate term and a requested reliability term.

In some embodiments, the communication service offers may include an offered data-rate term, an offered reliability, and/or an offered price term.

The communication service of the method may, for example, include a communication type, which may be Internet access, a voice call, a text message, and/or email.

In accordance with some embodiments, a method of accessing a network may employ TPRP, and/or may include receiving a service request for a communication service. The method may include transmitting an offer in response to the service request, where the offer may be associated with a communication service connection to a network access point. The method may also include providing the communication service connection to a network access point based on the offer being selected, for example, by a UE.

The method may include an offer based on a transmission power.

In some cases, the transmission power of the method may be a function of a user equipment making the service request.

In some embodiments, the method may include an offer based on a cost for transmission power of the communication service connection, and the cost may be based on a current utility rate for electric power.

In accordance with some embodiments, a system for accessing a network may employ TPRP. The system may include means for transmitting a service request for a communication service. The system may include means for receiving offers in response to the service request, and each offer may be associated with a communication service connection to a network access point. The system may also include means for selecting one of the offers based on a service metric, which may be a function of at least a price and a transmission power associated with each of the communication service connections.

The system may, in some cases, include means for facilitating the communication service connection between a user equipment and the network access point associated with the selected offer.

In some embodiments of the system, the transmission power may be the power required for a user equipment to communicate via the respective communication service connections associated with each offer.

In some embodiments of the system, the service metric may be a function of remaining batter power of a user equipment, in addition to the price and/or transmission power associated with each of the communication service connections.

The transmission power, in some embodiments of the system, may be the power required for an access point to communicate via the respective communication service connections associated with each offer.

The system may, for example, involve a service request that includes a requested data-rate term and a requested reliability term.

The communication service of the system may, for example, include a communication type, which may be Internet access, a voice call, a text message, and/or email.

In accordance with some embodiments, a system for accessing a network may employ TPRP and/or may include receiving a service request for a communication service. The system may include transmitting an offer in response to the service request, where the offer may be associated with a communication service connection to a network access point. The system may also include providing the communication service connection to a network access point based on the offer being selected, for example, by a UE.

The system may, in some cases, include an offer based on transmission power.

The transmission power of the system may be a function of a user equipment making the service request.

In accordance with some embodiments, the offer may be based on a cost for transmission power of the communication service connection, and the cost may be based on a current utility rate for electric power.

The system may, for example, include an offer based on a channel quality indicator.

In accordance with some embodiments, an apparatus for accessing a network may employ TPRP. The apparatus may include a transmitter configured to transmit a service request for a communication service. The apparatus may include a receiver configured to receive offers in response to the service request, and each offer may be associated with a communication service connection to a network access point. The apparatus may also include an offer selector configured to select one of the offers based on a service metric, which may be a function of a price and a transmission power associated with each of the communication service connections.

Some embodiments of the apparatus may include a computer server configured to facilitate the communication service connection between a user equipment and the network access point associated with the selected offer.

In some embodiments of the apparatus, the transmission power is power required for a user equipment to communicate via the communication service connections associated with each offer.

In some cases, the service metric of the apparatus may be a function of remaining battery power of a user equipment in addition to the price and the transmission power associated with each of the communication service connections.

In some embodiments of the apparatus, the transmission power is power required for an access point to communicate via the communication service connections associated with each offer.

The service request of the apparatus may include a requested data-rate term and a requested reliability term.

In some embodiments of the apparatus, the communication service includes a communication type from the group including: Internet access, a voice call, a text message, or email.

In accordance with some embodiments, an apparatus for accessing a network may employ TPRP. The apparatus may include one or more processors. The processors may be configured for transmitting a service request for a communication service. The processors may be configured for receiving offers in response to the service request, and each offer may be associated with a communication service connection to a network access point. The processors may also be configured for selecting one of the offers based on a service metric, which may be a function of at least a price and a transmission power associated with each of the communication service connections. The apparatus may include memory coupled to the processors.

In some cases, the processors may be configured for facilitating the communication service connection between a user equipment and the network access point.

In some embodiments, an apparatus for accessing a network may employ TPRP, and/or may include one or more processors configured for receiving a service request for communication service. The processor may be configured for transmitting an offer in response to the service request for a communication service, and the offer may be associated with a communication service connection to a network access point. The processor may also be configured for providing a communication service connection to a network access point based on the offer being selected.

In some cases, a computer-program product for accessing a network may employ TPRP. The computer-program product may include a non-transitory computer-readable medium with stored instructions. The instructions may be executable by one or more processors. The stored instructions may include instructions for transmitting a service request for a communication service. The instructions may include instructions for receiving offers in response to the service request, where each offer may be associated with a communication service connection to a network access point. The instructions may include instructions for selecting one of the offers based on a service metric, which may be a function of at least a price and a transmission power associated with each of the respective communication service connections.

Some embodiments of the computer-program product may include instructions for facilitating the communication service connection between a user equipment and the network access point associated with the selected offer.

In accordance with some embodiments, a computer-program product for accessing a network may employ TPRP. The computer-program product may include a non-transitory computer-readable medium with stored instructions. The instructions may be executable by one or more processors. The instructions may include instructions for receiving a service request for a communication service. The instructions may include instructions for transmitting an offer in response to the service request, and the offer may be associated with a communication service connection to a network access point. The instructions may further include instructions for providing a communication service connection to a network access point based on the offer being selected.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
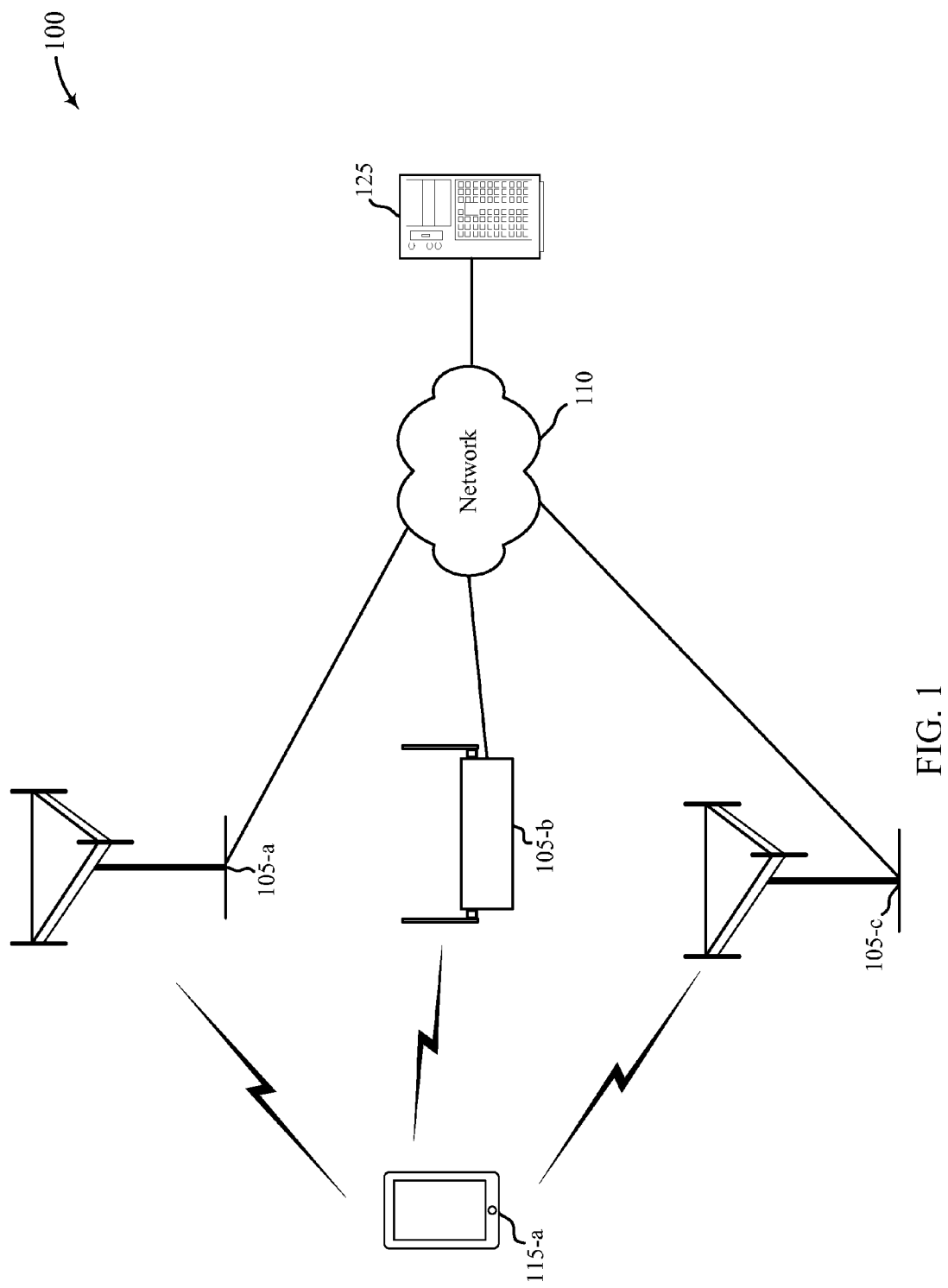
FIG. 1 shows a diagram of a wireless communications system according to some embodiments.

Methods, systems, and devices for requesting, transmitting, receiving, and selecting requests and competitive offers for communications service are provided in accordance with various embodiments. The methods, systems, and devices may provide for resolving issues associated with a wireless user equipment's (UE) inability to search for and/or request real time offers for communications service, which reflect a market price for a user's intended communications. Additionally or alternatively, the methods, systems, and devices may provide for resolving a wireless access point's inability to search for and/or respond to a request from a UE for real time offers for communications services, which reflect a market price for providing service for a user's intended communications.

In some cases, a wireless service auctioning system may be referred to as a toll path routing protocol ("TPRP"). This protocol may be employed on a mobile device, user equipment (UE), wireless access points, or other component/devices capable of wireless or wired communication. TPRP may facilitate requesting, processing, and/or negotiating communication service with a network.

In some scenarios, a TPRP-enabled UE may transmit a service request for communication service to any number of TPRP-enabled APs. The service request may include: a rate term, such as a preferred data transfer rate; a reliability term, such as a guaranteed minimum data transfer rate; and a price term, such as a maximum amount of money a user is willing to pay (e.g., based on an amount of data or time, etc.). The service request may include a preference term, which may consist of a user's designation of whether she or he prefers higher data rates or lower costs. To facilitate as many potential network connections as possible, a TPRP-enabled UE may be capable of communicating with TPRP-enabled APs associated with licensed-spectrum cellular service providers as well as TPRP-enabled APs using unlicensed spectrum (e.g., WiFi, etc.). A TPRP-enabled UE also may be capable of connecting to wired TPRP-enabled APs using a variety of wired network access connections (e.g., Ethernet, USB, and the like).

In response to a service request, a TPRP-enabled UE may receive offers to provide communications service. The TPRP-enabled UE may be equipped to process responsive bids or offers and accept one of the bids or offers. The TPRP-enabled UE may select an offer based in whole or part on the transmission power requirements and/or battery life implications of selecting the offer. The TPRP-enabled AP associated with the accepted bid or offer may facilitate or provide network access according to terms of the accepted bid or offer. The TPRP-enabled APs may be associated with licensed-spectrum cellular service providers, unlicensed-spectrum service providers, including WiFi APs, and/or wired APs.

TPRP may be employed on a UE, an AP, a computer server system, and/or a component device of any of these. A TPRP-enabled apparatus may request, receive, and evaluate received offers or bids. A TPRP-enabled apparatus may select one of the offers or bids and facilitate connection with a wireless network associated with the selected bid. TPRP may be implemented with varying degrees on user input—for example, setting preferences for evaluation of offers or bids may be performed by a user while other aspects of TPRP are performed automatically by a TPRP-enabled apparatus.

A TPRP-enabled apparatus may request and/or respond to requests by updating or refreshing previous requests or responses, which may occur automatically, or with user input. For example, a TPRP-enabled UE may seek to establish a connection with a TPRP-enabled AP, and then continue seeking offers or bids for communication service in order to achieve a service connection at a best available rate. Alternatively, a TPRP-enabled apparatus may transmit service requests at some pre-defined schedule.

Techniques described herein may be used for various wireless communications systems. These can include cellular wireless systems, Peer-to-Peer wireless communications, wireless local access networks (WLANs), ad hoc networks, satellite communications systems, and other systems. A WLAN (or WiFi network) may refer to a network that is based on the protocols described in the various IEEE 802.11 standards (e.g., 802.11a/g, 802.11n, 802.11ac, 802.11ah, etc.). The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100 in accordance with various embodiments. The system 100 includes wireless or wired access points (APs) 105, a core network 110, wireless devices 115, and a computer server system 125. The APs 105 may communicate with the wireless devices 115, which communication may include providing network access to the core network 110. The APs 105 may communicate control information and/or user data with the core network 110 through backhaul links. In some embodiments, the APs 105 may communicate, either directly or indirectly (e.g., by way of the core network 110), with each other. The system 100 may support operation on multiple carriers (e.g., waveform signals of different frequencies).

The APs 105 may wirelessly communicate with the wireless devices 115 via one or more AP antennas. Each of the APs 105 may provide communication coverage for a respective geographic area using a particular radio technology (e.g., WiFi, CDMA, LTE/LTE-A, etc.). Each of the APs 105 may be associated with a particular wireless service provider (e.g., a licensed-spectrum cellular service provider, WiFi service provider, etc.), which may be a mobile network operator ("MNO"). The geographic areas for different MNOs may overlap, such that each of the APs 105 serve the same physical area on behalf of different MNOs. APs may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The system 100 may include APs 105 of different types (e.g., macro, micro, pico, and/or femto base stations) and/or which operate within both licensed-spectrum (e.g., cellular) and unlicensed-spectrum (e.g., WiFi). There may be overlapping coverage areas for different technologies.

A wireless device 115 may be stationary or mobile. A wireless device 115 may also be referred to by those skilled in the art as a UE, mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, a machine-type communication (MTC) device, or the like. A wireless device 115 may be able to communicate with macro eNBs, pico eNBs, femto eNBs, relays, WLAN routers, Bluetooth modems, and the like.

System 100, including the APs 105 and wireless devices 115, may be configured for requesting, transmitting, receiving, and selecting requests and competitive offers for communications service in accordance with various embodiments. The system 100 may provide for resolving issues associated with a user's inability to search for and/or request real time offers for communications service, which reflect a market price for a user's intended communications. Additionally or alternatively, the system 100 devices may provide for resolving a wireless access point's inability to search for and/or respond to a request from a UE for real time offers for communications services, which reflect a market price for providing service for a user's intended communications.

In some cases a wireless service auctioning system, or TPRP, may be employed on the wireless device 115-a. TPRP can facilitate requesting, processing, and/or negotiating communication service with a network. TPRP may also be employed on or with APs 105. A TPRP-enabled wireless device 115-a may transmit a service request for communication service to one or more TPRP-enabled APs 105. The service request may include: a data rate term, such as a preferred data transfer rate; a reliability term, such as a guaranteed minimum data transfer rate; and a price term, such as a maximum amount of money a user is willing to pay (e.g., based on an amount of data or time, etc.). The service request may include a preference term, which may consist of a user's designation of whether she or he prefers higher data rates or lower costs. In order to facilitate as many potential network connections as possible, a TPRP-enabled wireless device 115-a may be capable of communicating with TPRP-enabled APs 105 associated with licensed-spectrum cellular service providers as well as TPRP-enabled AP 105 using unlicensed spectrum (e.g., WiFi). The TPRP-enabled wireless device 115 may also capable of connecting to wired TPRP-enabled APs 105 using a variety of wired network access connections (e.g., Ethernet and USB).

In response to a service request, the TPRP-enabled wireless device 115-a may receive offers to provide communications service. The TPRP-enabled wireless device 115-a may be equipped to process responsive bids or offers and accept one of the bids or offers. The TPRP-enabled wireless device 115-a may select an offer based in whole or part on the transmission power requirements and/or battery life implications of selecting the offer. The TPRP-enabled AP 105 associated with the accepted bid or offer may facilitate or provide network access according to terms of the accepted bid or offer. The TPRP-enabled APs 105 may be associated with licensed-spectrum cellular service providers, unlicensed-spectrum service providers, including WLAN APs, and/or wired APs.

TPRP may be employed on the wireless device 115-a, the APs 105, the computer server system 125, and/or a component device of any of these. The TPRP-enabled apparatus may request, receive, and evaluate received offers or bids. The TPRP-enabled apparatus may select one of the offers or bids and facilitate connection with a wireless network associated with the selected bid. TPRP may be implemented with varying degrees on user input—for example, evaluating offers or bids may be performed by a user while other aspects of TPRP are performed automatically by a TPRP-enabled apparatus.

A TPRP-enabled apparatus may request and/or respond to requests by updating or refreshing previous requests or responses, which may occur automatically, or with user input. For example, a TPRP-enabled wireless device 115-a may seek to establish a connection with a TPRP-enabled AP 105, and then continue seeking offers or bids for communication service in order to achieve a service connection at a best available rate. Alternatively, a TPRP-enabled apparatus may transmit service requests according to some pre-defined schedule.

In some embodiments, a wireless device 115-a is capable of broadcast and/or unicast transmission to and reception from APs 105. For example, these transmissions can include TPRP-enabled eNBs and TPRP-enabled WLAN APs, both of which may be operated by MNOs. A TPRP-enabled wireless device 115-a may transmit a service request and, in response, receive offers for service from TPRP-enabled APs 105. The wireless device 115-a may select one of the offers and establish a connection to the core network 110 via the AP 105 associated with the selected offer. The wireless device 115-a may utilize a service metric, which may be an aspect of the TPRP, to select an offer. The service metric may be based in part on a transmission power associated with communication with the respective AP 105.

Figure 2A:
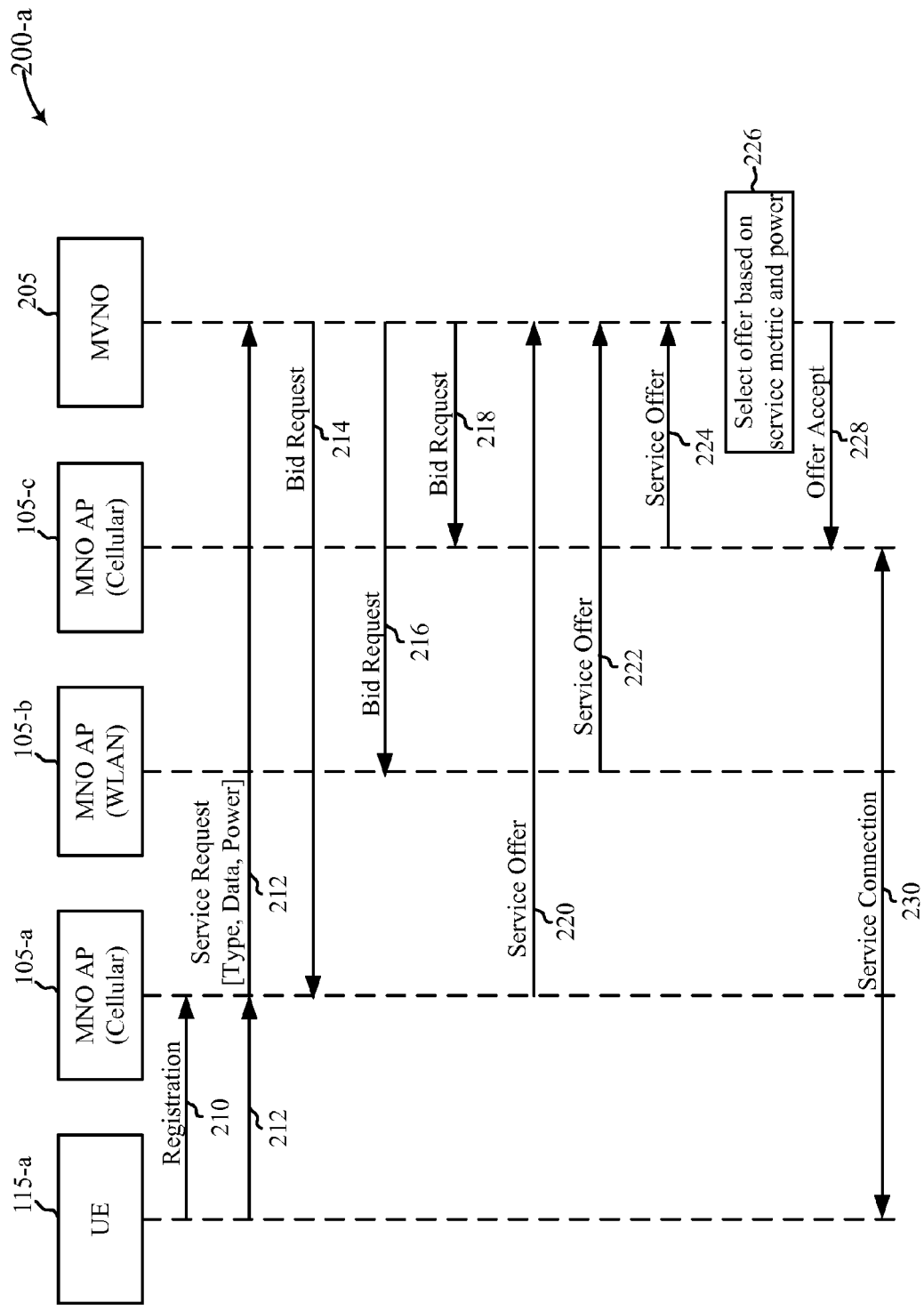
FIGS. 2A and 2B show diagrams of message flow in a wireless communications system according to some embodiments.

FIG. 2A illustrates an example of a message flow diagram 200-a illustrating service offer selection using TPRP in a wireless communication system in accordance with various embodiments. The message flow 200-a may be implemented by, for example, the system 100. The message flow diagram 200-a may enable a wireless device user to obtain real time, market-based pricing for wireless communication service. The message flow 200-a may be implemented to enable wireless communications service providers, such as MNOs, to find and offer service to such users. The message flow 200-a illustrates exemplary communication between TPRP-enabled UE 115-*a* and TPRP-enabled APs 105-*a*, 105-*b*, and 105-*c*, which may be the wireless device and APs illustrated in FIG. 1. TPRP-enabled APs 105-*a*, 105-*b*, and 105-*c* may be APs operated by MNOs, and/or they may be cellular or WLAN APs, or any other wired or wireless AP capable of supporting TPRP. The system 200 may include a mobile virtual network operator ("MVNO") 205, which may facilitate connection of a UE 115 to one of the MNO APs 105. Those skilled in the art will recognize that an MVNO may be a cellular service provider that has access agreements with MNOs for access to MNO-managed networks and/or hardware, and the MVNO generally facilitates network access via the MNO-managed hardware, including MNO APs.

In some embodiments, the UE 115-*a* may have a service agreement with MVNO 205 and may register 210 (e.g., via a control channel, etc.) with an MNO AP 105-*a* to establish a limited service network connection. The limited service network connection may provide location and mobility management services while not supporting data transfer (e.g., voice calls, packet data, etc.). For example, the limited service network connection may provide communication with a mobility or location management entity (e.g., mobility management entity (MME), home location register (HLR), etc). The user may initiate a communication (e.g., application, voice call, etc.) with another device and/or network. The MVNO 205 may be implemented on one or more computer servers, such as the computer server 125 of FIG. 1, which may be in communication with APs 105 via the core network 110. After the MVNO 205 selects an offer, the MVNO 205 may accept the offer 228, and thus may facilitate a service connection 230 between the UE 115 and the MNO AP 105-*c*, which may be associated with the selected service offer.

To initiate the communication, the UE 115-*a* may send a service request 212 to MVNO 205 via the MNO AP 105-*a*. The service request 212 may include a variety of TPRP service parameters. For example, the parameters may include information about the type of communication the user seeks to transmit or receive (e.g., voice call, text message, Internet browsing, video stream, music file download, etc.), the quantity of data to be transferred in the communication, the requested or preferred data rate for the communication, the location of the UE 115-*a* (e.g., GPS coordinates, tracking area, etc.), power metrics of the UE 115-*a* (e.g., remaining battery life, etc.), and/or user preferences (e.g., the amount of transmission power that may be required for a designated type of communication and/or whether a user desires a higher speed connection or lower power consumption). Other parameters can also be included in a service request 212. The service request 212 may include requests for multiple communications of different service types with parameters associated with each service type. A service request parameter related to transmission power may be equated and/or referred to in terms of implications on the battery life of UE 115-*a*. The UE 115-*a* may also consider implications on battery life associated with sending and/or updating a service request.

In response to receiving service request 212, MVNO 205 may determine the available APs 105-*a*, 105-*b*, and/or 105-*c* (e.g., based on location of UE 115-*a*, etc.). MVNO 205 may send and/or facilitate transmitting bid requests 214, 216, and 218 to the available MNO APs 105-*a*, 105-*b*, and 105-*c*. The bid requests 214, 216, and 218 may be sent to APs which may be associated with cellular networks, WiFi network access, or other wireless communication technologies. In reply to the bid requests 214, 216, and 218, the MNO APs 105-*a*, 105-*b*, and 105-*c* may send service offers 220, 222, and 224 to MVNO 205. In some embodiments, the service offers include TPRP offer parameters, which may include terms related to data rates, data quantities, quality of service (QoS), reliability of service, transmission power for service, and/or price for service (e.g., price per MB, etc.). The service offers may include different terms for different tiers of service. For example, the service offers may include prices for different volume tiers or QoS tiers.

The MVNO 205 may receive and/or facilitate receiving the service offers 220, 222, and 224. The MVNO 205 may evaluate the service offers based on a service metric, which may be a function of price and transmission power. The MVNO may select, for example, the service offer providing the lowest value of the function of price and transmission power. The MVNO may also apply constraints according to price and/or transmission power and select the service offer representing the best offer of those offers satisfying the constraint. For example, the MVNO may select the lowest price offer of those offers meeting a power constraint.

In some arrangements, the transmission power parameter of the service metric may be equated to a battery life characteristic of a battery of the UE 115. For example, the battery life characteristic may be a price-equivalent of the battery life expended if a particular service offer is accepted. In some cases, a specific communication type, such as streaming videos, may have a greater effect on battery life if the UE 115 receives communication service via a connection to AP 105-*a* than if a user connects to AP 105-*c*. The service metric may equate this battery life effect to a price-equivalent, which may be a factor compared directly with a price term associated with a service offer. In other words, MVNO 205 may select an offer with a slightly higher price per unit of data if the transmission power (e.g., battery life) associated with that offer represents an overall economic benefit. In some embodiments, TPRP may be used by the wireless device 115 to send the user-defined service parameters and service selection method (e.g., according to the lowest service metric of a function or sub-selection by maximum transmission power constraint, etc.). For example, TPRP can convey user-defined parameters, including terms related to the maximum price a user may be willing to pay, the maximum transmission power and/or battery life requirements a user may expect, and/or a transmission power price factor expressed in terms of an equivalent price for a given amount of transmission power.

The service metric may be dynamic such that a determined price-equivalent of the battery life effect may be a function of an initial battery state. For example, the service metric may consider a non-linear battery discharge in determining a price-equivalent of the battery life implications of selecting a particular service offer. In some cases, the service metric may select one service offer primarily because of the initial battery state is nearly fully charged. The service metric may subsequently select a different service offer based primarily on a relatively discharged battery state. This may be because the service metric may determine that the price-equivalent of the battery life effect may be greater for a battery in a discharged state.

Figure 2B:
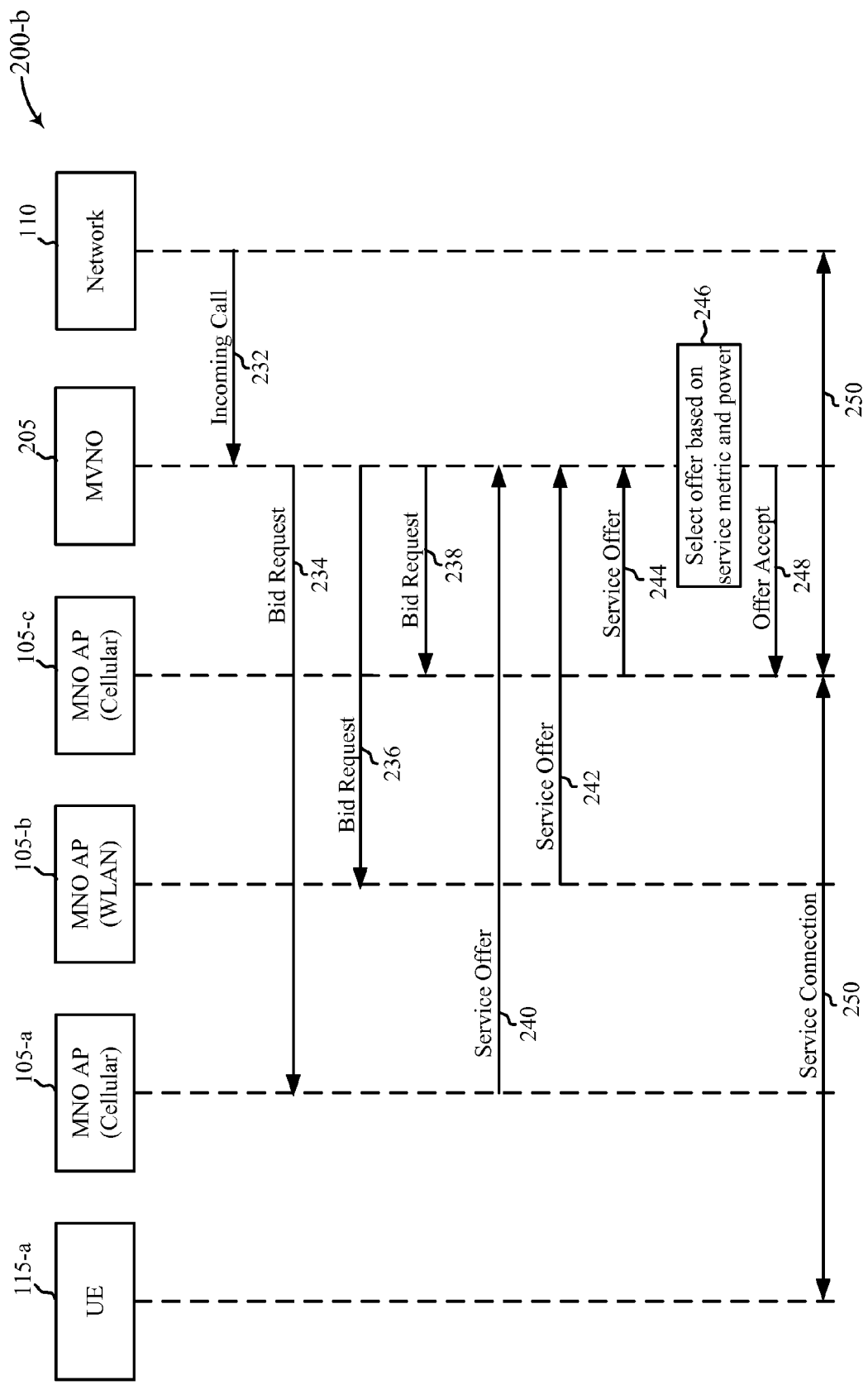

FIG. 2B is a message flow diagram 200-*b* that illustrates an incoming call scenario in a wireless communications system with TPRP-enabled devices. The message flow 200-*b* may be implemented, for example, in system 100. In the message flow 200-*b*, the MVNO AP 205 may receive an incoming call 232 for UE 115-*a* The MVNO 205 may transmit bid requests 234, 236, and 238 to MNO APs 105-*a*, 105-*b*, and 105-*c*, respectively. The bid requests may request offers or bids to provide communication service to UE 115-*a* to facilitate the incoming call 232. The bid requests may include any or all of the TPRP service parameters discussed above.

The MNO APs 105 may transmit service offers 240, 242, and 244, which the MVNO 205 may receive. The MVNO 205 may select one of the offers based on a service metric, which may be based on transmission power, as described above. The MVNO 205 may select an offer without first contacting the UE 115-*a*. In the illustrated example, MVNO 205 accepts offer 248 from and MNO AP 105-*c*, which may then provide a service connection 250 to facilitate transmission of the incoming call 232 to the UE 115-*a*. In some cases, the negotiation and/or bid requests by the MVNO 205 will be performed without prior contact of the UE 115-*a*. In other words, the MVNO 205 will select, in real time, an MNO AP 105 for a service connection that provides the greatest economic benefit to the UE 115-*a*, and no prior action may be required from the UE 115-*a*. MVNO 205 may select offer 248 based on TPRP parameters received from UE 115-*a*, and may periodically receive TPRP parameter updates from UE 115-*a*.

Figure 3:
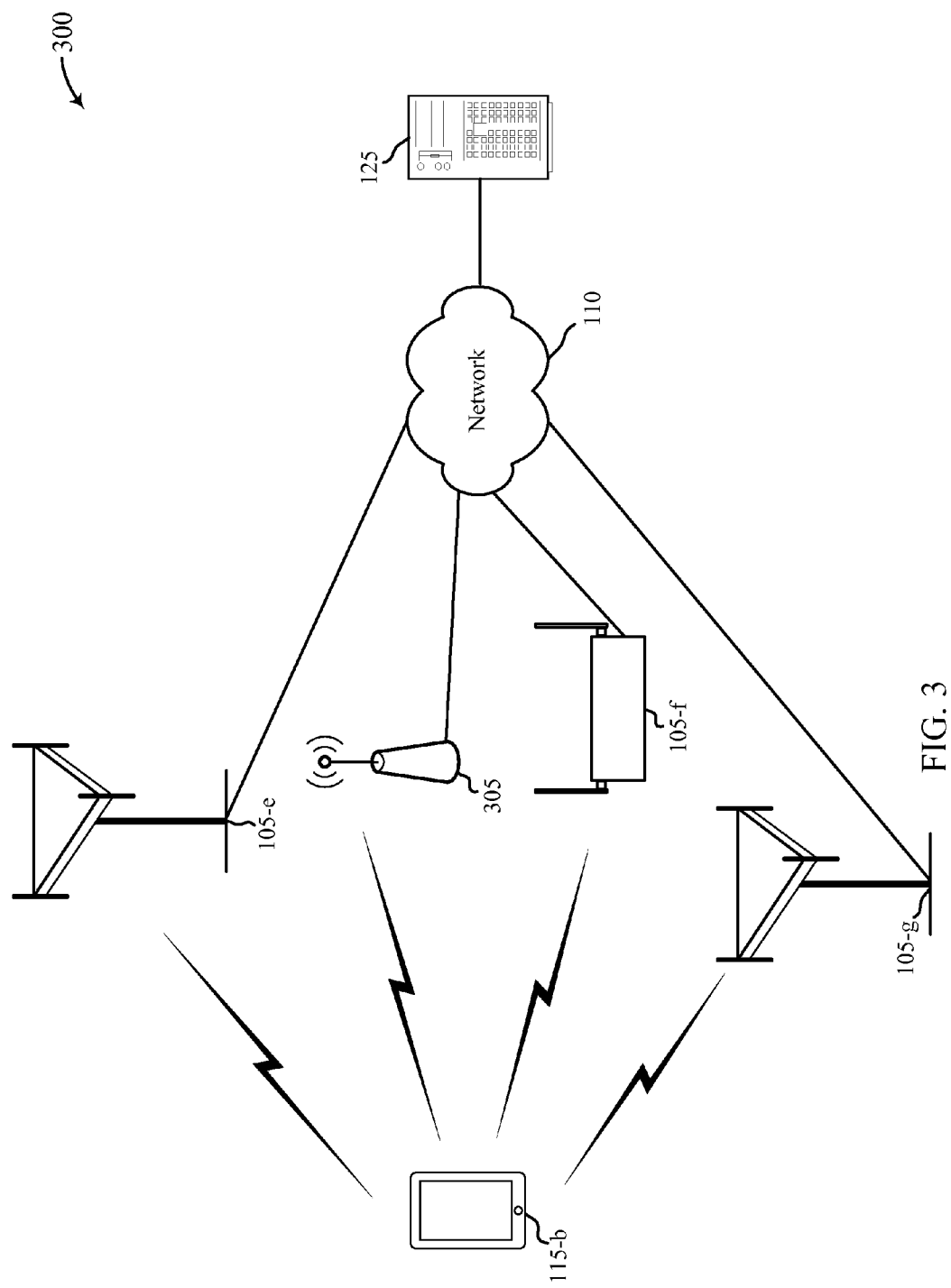
FIG. 3 shows a diagram of a wireless communications system according to some embodiments.

Turning next to FIG. 3, a diagram illustrates a wireless communications system 300 employing limited service MVNO APs in accordance with various embodiments. The system 300 includes APs 105, a core network 110, at least one wireless device 115-*b*, a computer server 125 and an MVNO AP 305. The APs 105 may communicate with the wireless device 115-*b*, which communication may include providing network access to the core network 110. The APs 105 may communicate control information, user data, and/or service requests with the core network 110 through backhaul links. In some embodiments, the APs 105 may communicate, either directly or indirectly (e.g., by way of the core network 110), with each other. The system 300 may support operation on multiple carriers (e.g., waveform signals of different frequencies). The system 300 may include aspects of system 100. For example, the core network 110 of the system 300 may be the core network 110 of the system 100.

The MVNO AP 305 may be a limited functionality, TPRP-enabled AP, and may be co-located with an AP 105 such as APs 105-*e*, 105-*f*, or 105-*g*. The MVNO AP 305 may offer limited access service via limited service connection links. For example, MVNO AP 305 may provide service using narrow or limited bandwidth connections. In one embodiment, MVNO AP 305 may be implemented using narrow bandwidth (e.g., 1.08 MHz, etc.) LTE/LTE-A carriers. MVNO AP 305 may provide mobility management and paging service to TPRP-enabled wireless devices, which may facilitate an initial connection with the wireless device, and which may obviate the need for a wireless device to register with an MNO AP to solicit service offers. MVNO AP 305 may provide limited data service (e.g., SMS, messaging, and the like) but typically does not support data flow over traffic channels (e.g., voice calls, Internet connection, video streaming or download, etc.). The MVNO AP 305 may communicate directly with the APs 105 via a direct connection (not shown), or via the core network 110 through backhaul links. In some embodiments, the computer server 125 may facilitate communication between the MVNO AP 305 and the APs 105.

Figure 4:
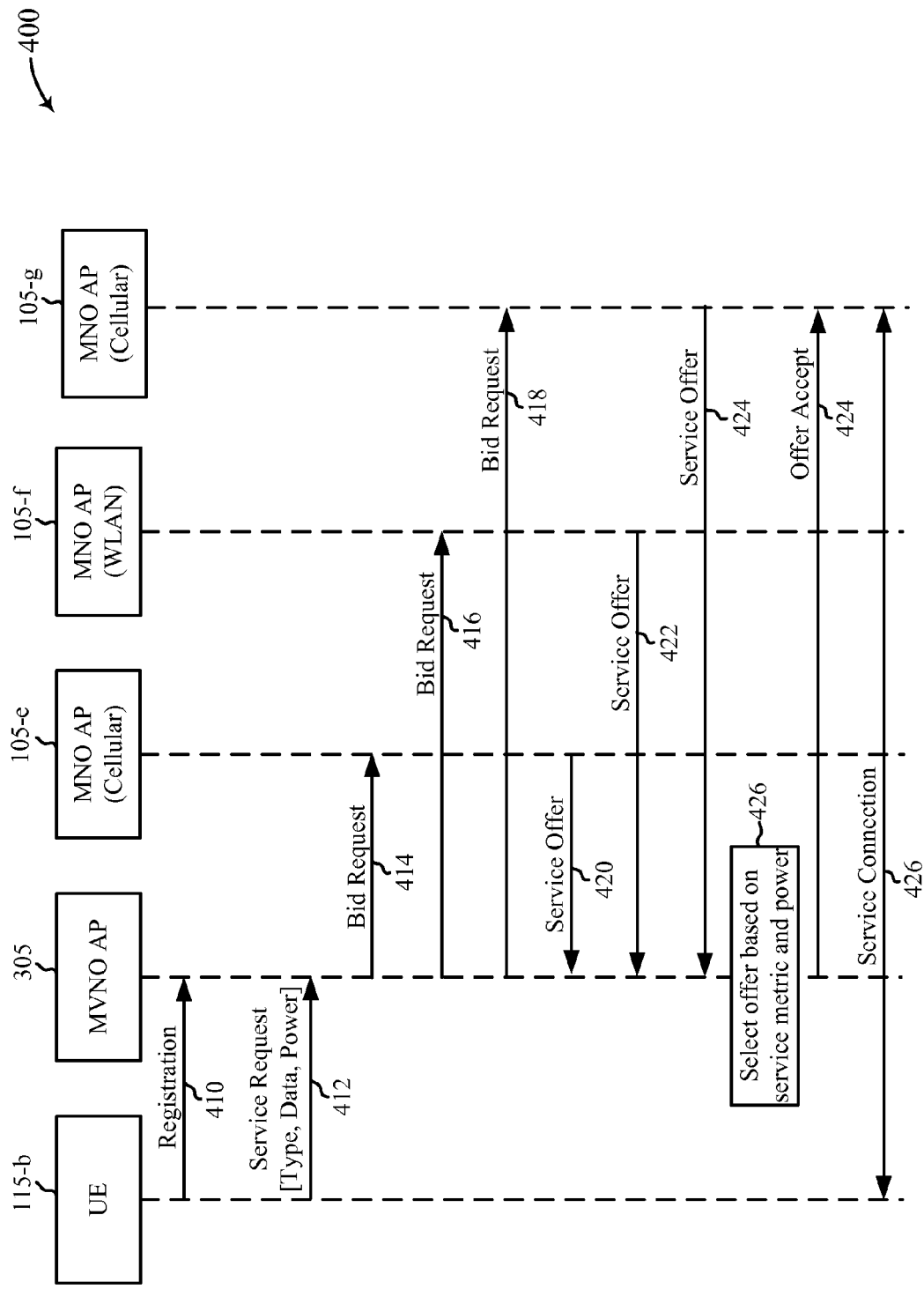
FIG. 4 shows a diagram of message flow in a wireless communications system according to some embodiments.

FIG. 4 illustrates an example of a wireless communications system 400 implementing TPRP with a TPRP-enabled UE 115, TPRP-enabled APs 105, and a TPRP-enabled MVNO AP 305. The message flow diagram 400 may be an example of the system 300. The message flow of diagram 400 may be implemented to enable a wireless device user to obtain real time, market-based pricing for wireless communication services. The message flow 400 may represent communications from devices including a TPRP-enabled UE 115-*b*, a TPRP-enabled MVNO AP 305, and TPRP-enabled APs 105, which may be the wireless device, MVNO AP, and APs illustrated in FIG. 3.

In some embodiments, the UE 115-*b* may register 410 with or "camp" on the MVNO AP 305 in order to establish a limited access service. When the user initiates a communication not supported by the limited access service MVNO AP 305, the UE 115 may transmit service request 412 to the MVNO AP 305. The service request 412 may include one or more of the TPRP service parameters described above.

After receiving the service request 412, the MVNO AP 305 may transmit, or facilitate transmitting bid requests 414, 416, and 418 to MNO APs 105, which may be examples of wired, cellular, WLAN, or other wireless APs. The MNO APs 105-*e*, 105-*f*, and 105-*g* may respond with service offers 420, 422, and 424. In some cases, the service offers may include terms related to data rates, data quantities, quality of service, reliability of service, transmission power for service, and/or price for service as described above. The MVNO AP 305 may receive and/or facilitate receiving the service offers 420, 422, and 424. The MVNO AP 305 may be an AP for an MVNO that may be implemented on one or more computer servers, such as the computer server 125 of FIG. 3, which may be in communication with one or more APs 105 via the core network 110. In some embodiments, an MVNO, which may be associated with the MVNO AP 305, may select one of the service offers based on a service metric as described above. After the MVNO selects an offer, the MVNO may accept the offer 424, which may be accomplished with a transmission from the MVNO AP 305 to an MNO AP 105 associated with the selected offer. The MVNO may thus facilitate a service connection 426 between the UE 115 and the MNO AP 105-*c*, which may be associated with the selected service offer.

Figure 5A:
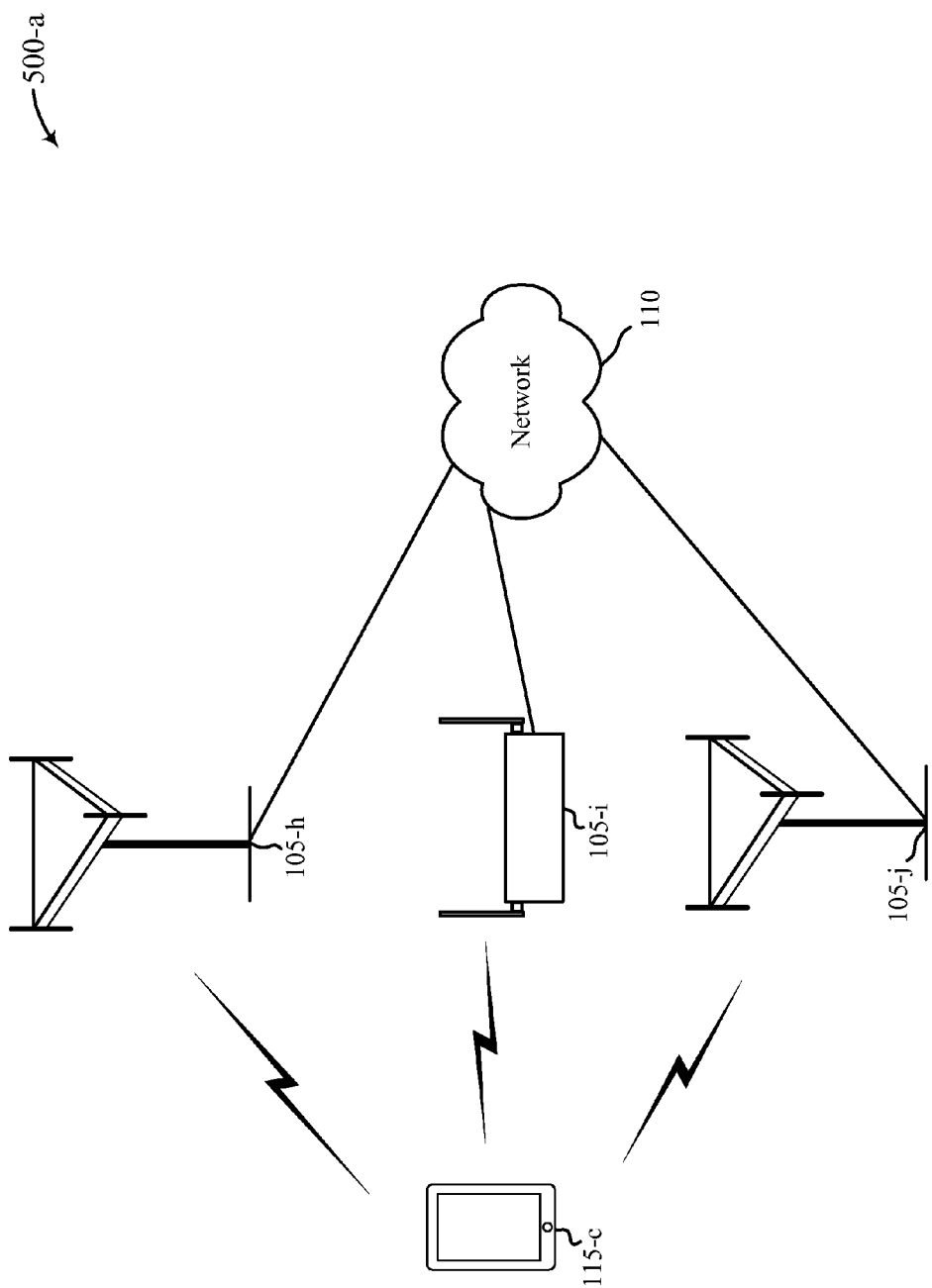
FIGS. 5A and 5B show diagrams of a wireless communications system(s) according to some embodiments.

Referring now to FIG. 5A, a diagram illustrates an example of a wireless communications system 500-*a* for distributed, non-agent based service offer selection employing TPRP in accordance with various embodiments. The system 500-*a* includes APs 105, a core network 110, and at least one wireless device 115. The system 500-*a* is an example of a non-agent based TPRP system. In some cases, the wireless device 115-*c* may broadcast service requests directly to APs 105 without the necessity of an MVNO entity (e.g., a computer server for performing offer solicitation, aggregating offers, and offer selection, etc.). The wireless device 115-*c* may independently be capable of receiving, evaluating, and selecting service offers from communication service providers. The wireless device 115 may be capable of receiving unsolicited service offers, which the APs 105 may broadcast to wireless devices (e.g., via pilots, synchronization signals, etc.). The APs 105 may communicate control information, user data, and/or service requests with the core network 110 through backhaul links. In some embodiments, the APs 105 may communicate, either directly or indirectly (e.g., by way of the core network 110), with each other. In some embodiments, an AP 105 may receive a service request from the wireless device 115, and the AP 105 may relay that service request to another AP 105. An AP 105 may likewise receive a service offer from another AP 105 and relay the service offer to the wireless device 115. Relaying service requests and/or service offers from a wireless device to another AP, or from one AP to a wireless device is referred to herein as "wheeling." The system 500-*a* may include aspects of systems 100 and 300. For example, the core network 110 of system 300 may be the core network 110 of the system 100.

Figure 5B:
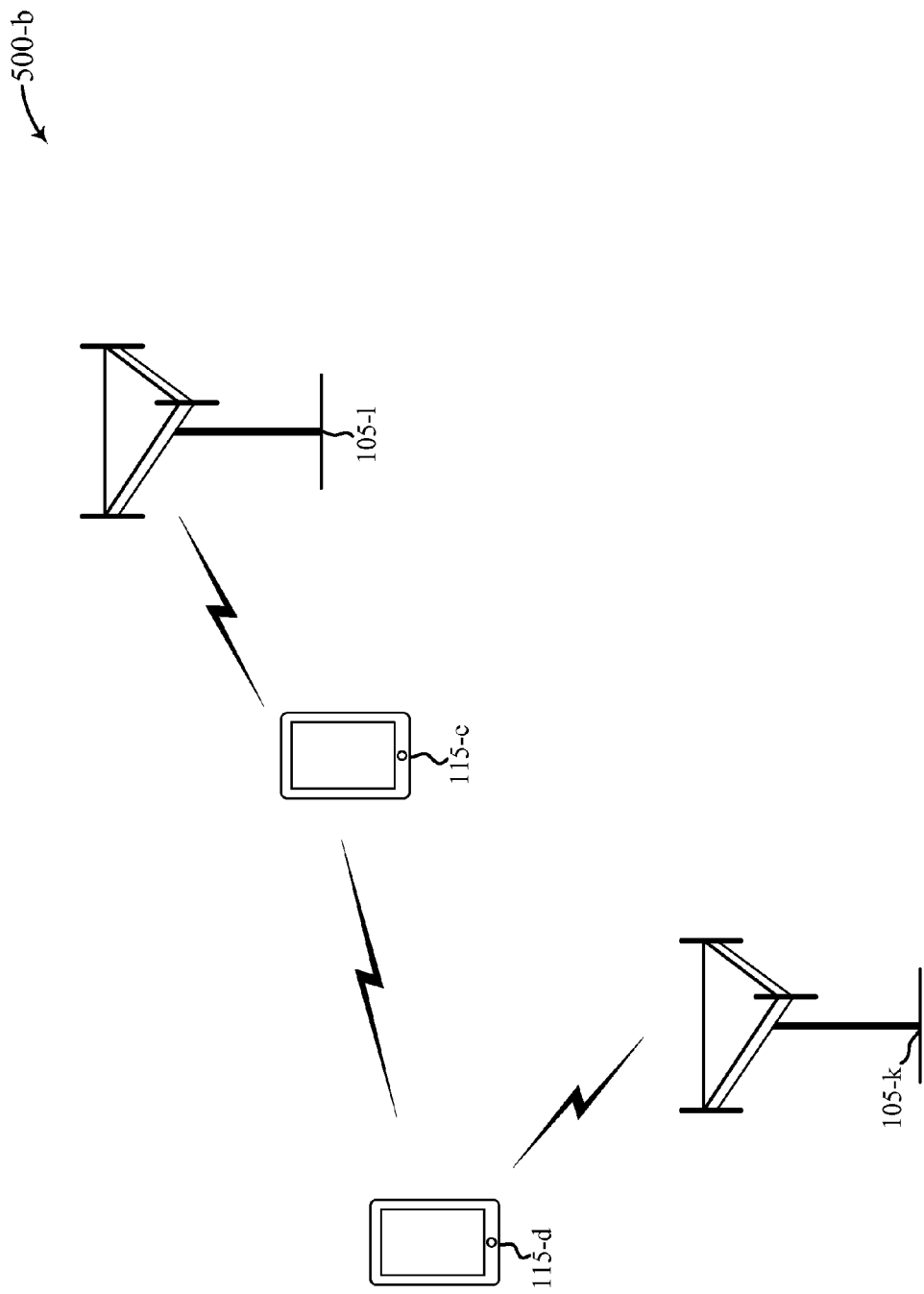

FIG. 5B is a diagram of a wireless system 500-*b* in which a TPRP-enabled wireless device may serve as a TPRP-enabled AP. In system 500-*b*, a TPRP-enabled wireless device 115-*d* may have a communication service connection with AP 105-*k*. A TPRP-enabled wireless device 115-*e* may transmit service requests for communication service. The wireless device 115-*e* may receive service offers from the TPRP-enabled AP 105-1 and the wireless device 115-*d*. The wireless device may utilize a service metric as described above to select an offer from the wireless device 115-*d*. The wireless device 115-*d* may provide communications service to the wireless device 115-*e* for a price based on data use. In some embodiments, the wireless device 115-*d* may benefit from providing communications service to the wireless device 115-*e* by utilizing one or more ad-supported applications, which may require the user of the wireless device 115-*e* to view or otherwise interact with commercial advertising in exchange for communication service. The ad-supported application(s) may be operated in conjunction with a third party entity that pays the user of the wireless device 115-*d* for facilitating advertising to the user of the wireless device 115-*e*.

Figure 6A:
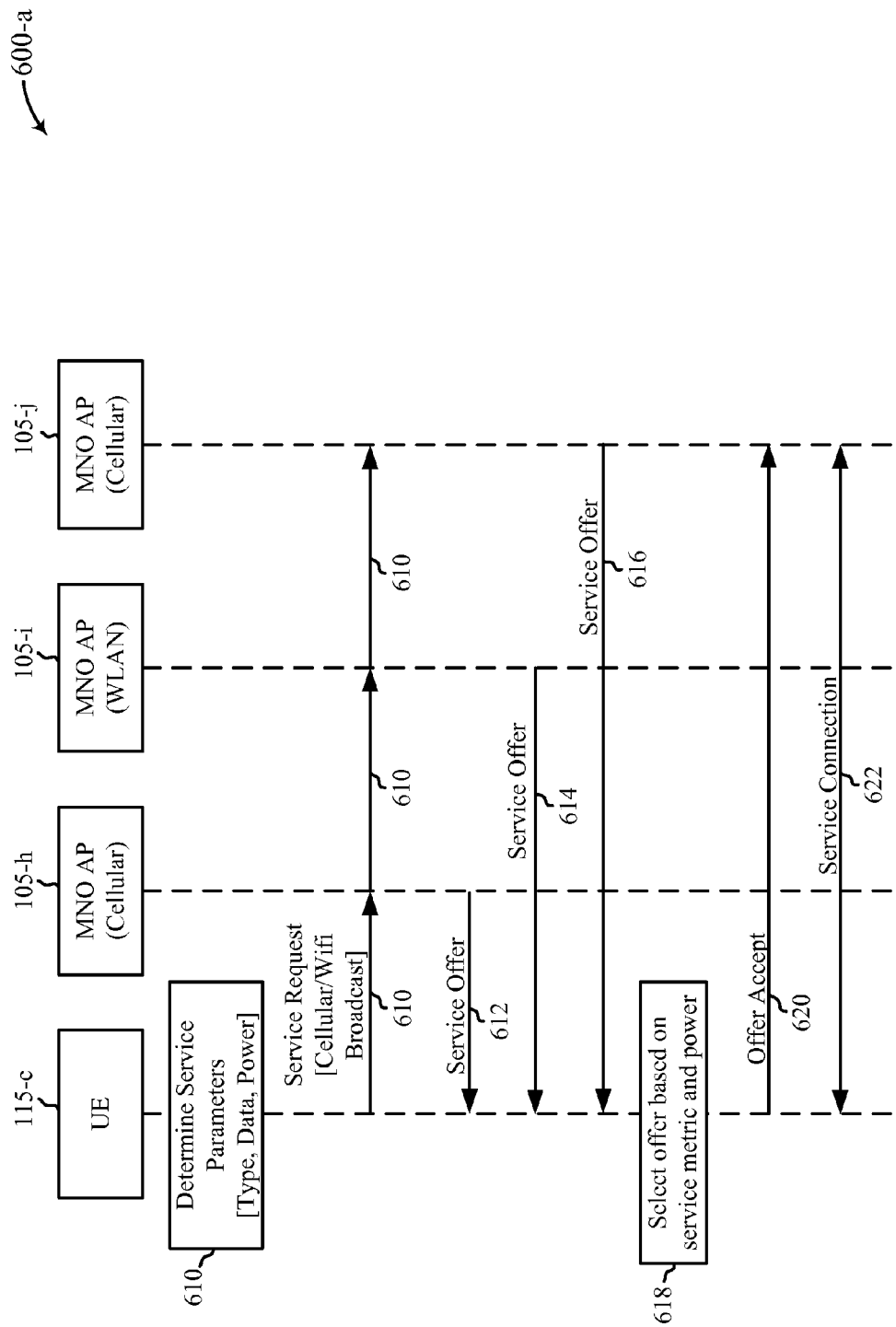
FIGS. 6A, 6B, and 6C show diagrams of message flow in a wireless communications system or systems according to some embodiments.
Figure 6B:
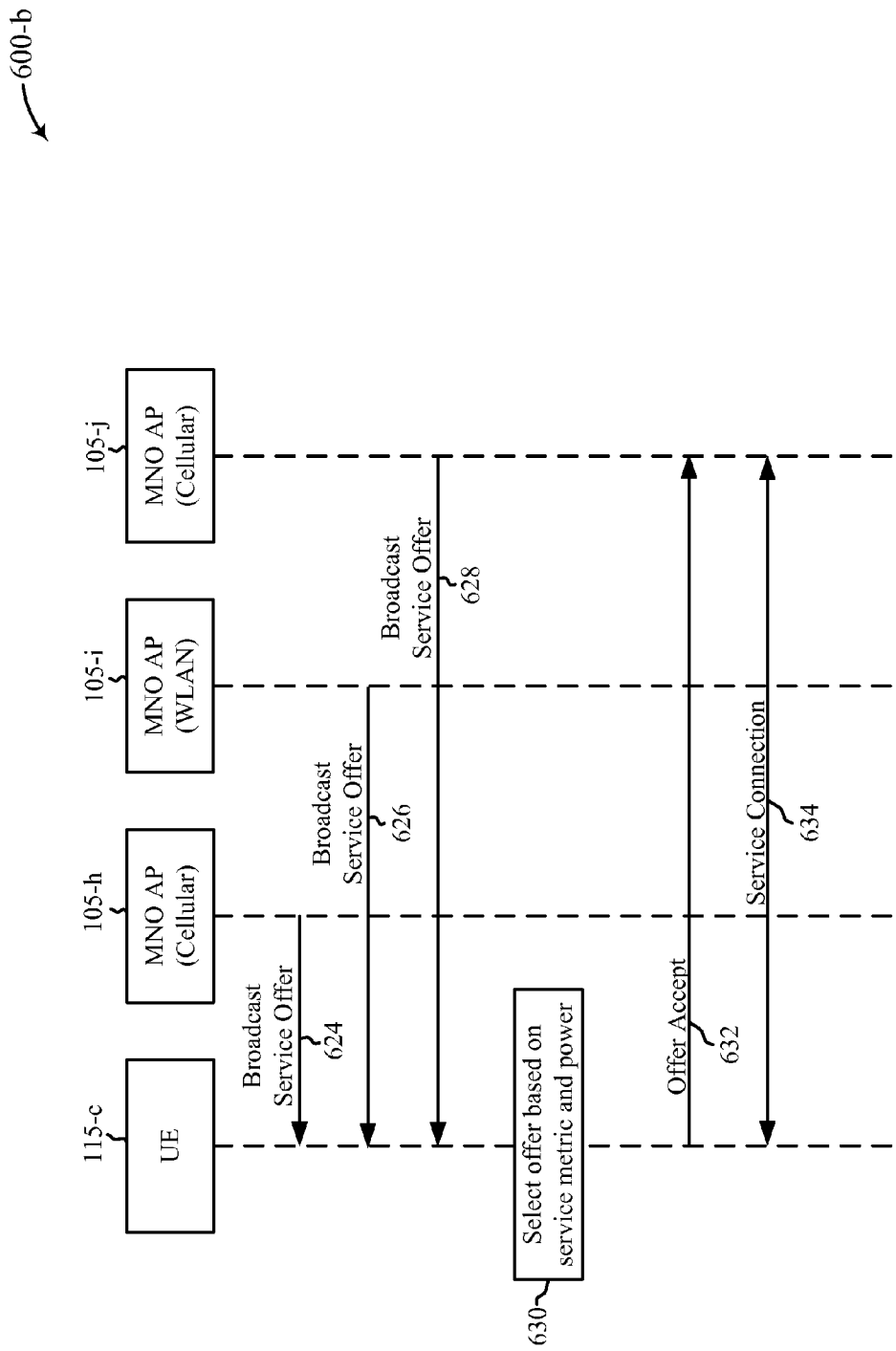
Figure 6C:
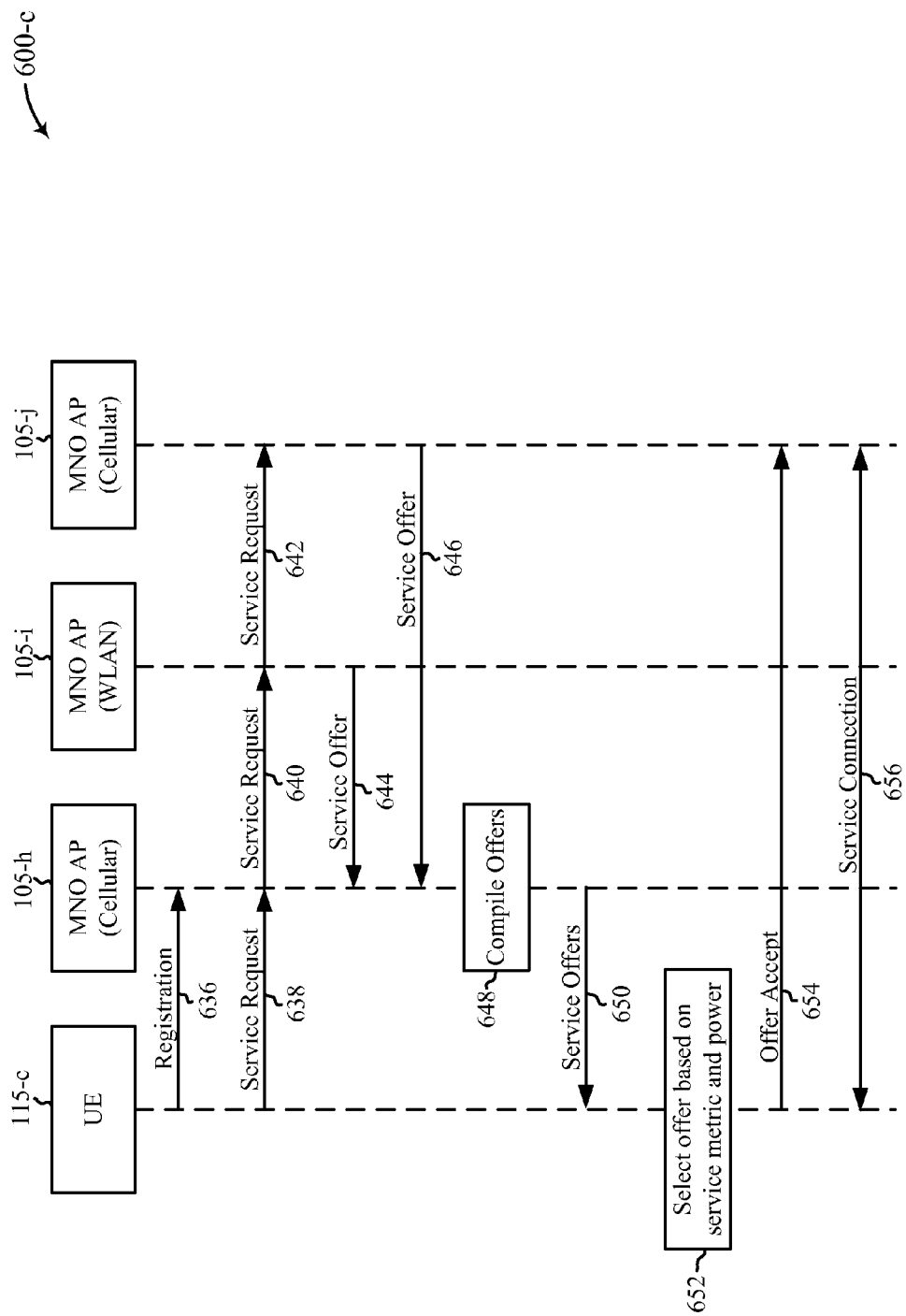

FIGS. 6A, 6B, and 6C illustrate examples of wireless communications message flows 600-*a*, 600-*b*, and 600-*c* for embodiments of systems implementing TPRP in accordance with various embodiments. The message flows 600-*a*, 600-*b*, and 600-*c* may be implemented, for example, in the system 500-*a*. Each of the message flows 600-*a*, 600-*b*, and 600-*c* illustrate examples of non-agent based TPRP systems, in which operations and decisions related to sending service requests, sending service offers, evaluating offers, selecting offers, and/or accepting offers is performed without a third party device, system, or control scheme, such as an agent computer server. In some embodiments, the message flows 600-*a*, 600-*b*, and 600-*c* utilize TPRP-enabled devices that are able to communicate with one another directly with few or no restrictions related to pre-determined service agreements and or arrangements.

Referring to FIG. 6A, a UE 115-*c* may determine service parameters, which may include information about the type of communication the user seeks to transmit or receive (e.g., voice call, text message, Internet browsing, video stream, music file download, etc.), the quantity and/or speed of data the user prefers, and/or preferences regarding the amount of transmission power that may be required for a designated type of communication. The UE 115 may broadcast a service request 610, which may be received by APs 105, which may be MNO APs. The service request may include one or more TPRP service parameters as described above. The service request 610 broadcast may be transmitted on multiple frequencies and/or using multiple radio technologies (e.g., WiFi, CDMA, LTE/LTE-A, etc.), which may facilitate the UE 115-*c* requesting service from a variety of APs 105, including cellular and WLAN APs 105, simultaneously. In response to the service request 610 broadcast, the UE 115-*c* may receive service offers 612, 614, and 616 from several MNO APs 105. The UE 115-*c* may select 618 one of the service offers based on a service metric, which may be based on transmission power. The UE 115-*c* may accept offer 620 from one of the APs 105 and may then obtain a service connection 622 with an AP 105.

Referring to FIG. 6B, APs 105 may broadcast unsolicited service offers 624, 626, and 628. A UE 115-*c* may receive any or all of the unsolicited service offers 624, 626, and 628. The UE 115-*c* may determine transmission power associated with communication with each of APs 105. For example, the UE 115-*c* may measure pilot signals of the APs and determine how much power it would take to transmit to each AP. The UE 115-*c* may select 630 one of the service offers based on a service metric as described above, which may be based on the determined transmission power. The service metric may evaluate the offers according to user-defined parameters, which may include information about the type of communication the user seeks to transmit or receive (e.g., voice call, text message, Internet browsing, video stream, music file download, etc.), the quantity and/or speed of data the user prefers, and/or preferences regarding the amount of transmission power that may be required for a designated type of communication. The UE 115 may accept an offer 632 from one of the APs 105 and may then obtain a service connection 634 with an AP 105.

Referring to FIG. 6C, the UE 115-*c* may register 636 itself with an AP 105. The UE 115 may then transmit a service request 638 to the AP 105. The AP 105 may then wheel the service request to other APs 105. In one example, the UE 115-*c* sends a service request 638 to MNO AP 105-*h*, which may be a cellular base station, and which wheels the service request 640, 642, to MNO APs 105-*i* and 105-*j*, which may be a WLAN router and a cellular base station, respectively. In response to the service request 638, 640, and 642, the MNO APs 105-*i* and 105-*j* may transmit service offers 644, 646. The service offers may be compiled 648 by or at MNO AP 105-*h*, which may then transmit all of the service offers 650 to the UE 115. In some embodiments, service requests/offers may be wheeled via tunneling (e.g., encrypted tunneling protocol, etc.), which may provide the ability for UE 115-*c* to receive the offers from APs 105-*i* and 105-*j* while preventing AP 105-*h* from intercepting the offers.

The UE 115-*c* may select 652 one of the service offers based on a service metric, which may be based on transmission power. The service metric may evaluate the offers according to user-defined parameters, which may include information about the type of communication the user seeks to transmit or receive (e.g., voice call, text message, Internet browsing, video stream, music file download, etc.), the quantity and/or speed of data the user prefers, and/or preferences regarding the amount of transmission power that may be required for a designated type of communication. The UE 115 may accept an offer 632 from one of the APs 105 and may then obtain a service connection 656 with an AP 105.

In each of the message flows 600-*a*, 600-*b*, and/or 600-*c*, the service offers may include terms related to data rates, data quantities, quality of service, reliability of service, transmission power for service, and/or price for service. The transmission power parameter of the service metric may be equated to a battery life characteristic of a battery of the UE 115. For example, the battery life characteristic may be a price-equivalent of the battery life lost if a particular service offer is accepted. In some cases, a specific communication type, such as streaming videos, may have a greater effect on battery life if the UE 115 receives communication service via a connection to AP 105-*h* than if a user connects to AP 105-*j*. The service metric may equate this battery life effect to a price-equivalent, which may be a factor compared directly with a price term associated with a service offer. In other words, a service metric may select an offer with a slightly higher price per unit of data if the transmission power (e.g., battery life) associated with that offer represents an overall economic benefit.

Figure 7A:
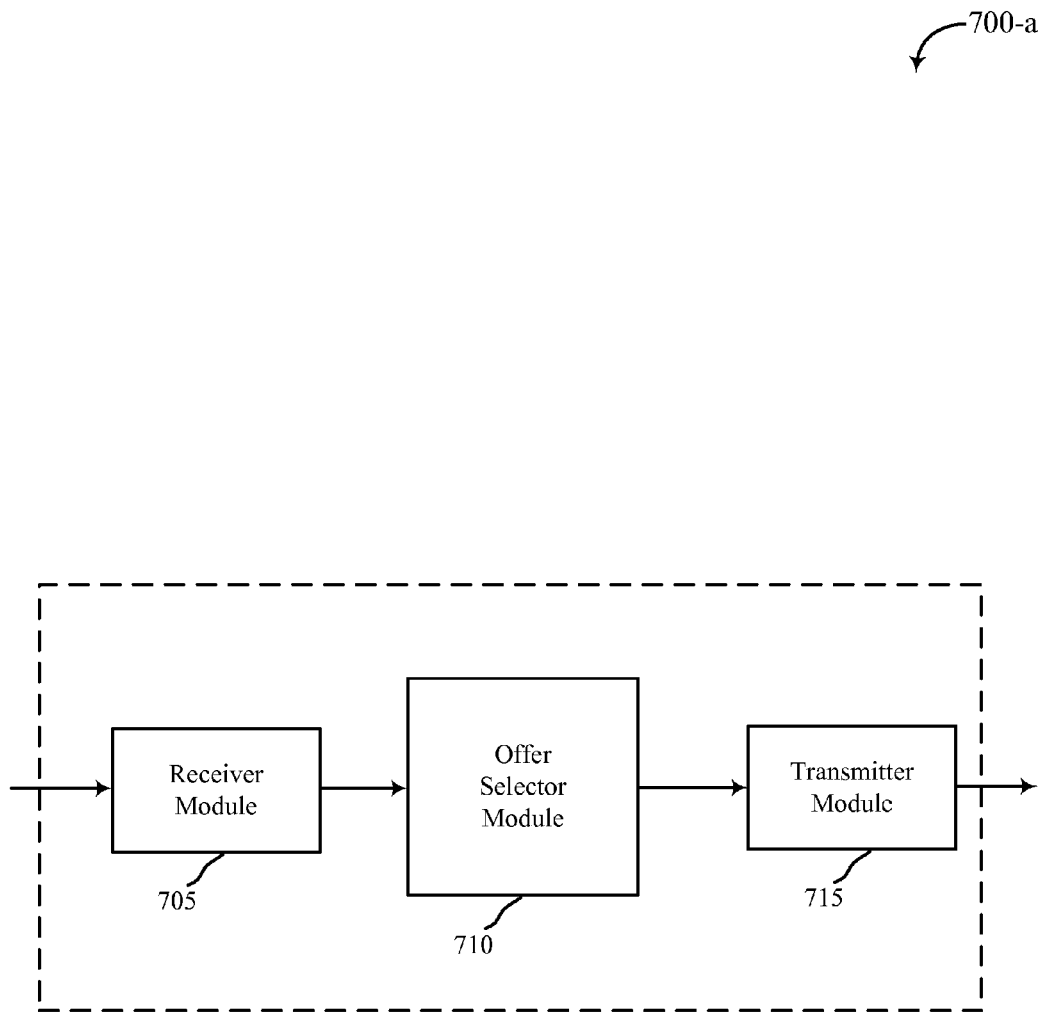
FIGS. 7A and 7B show diagrams of a device or devices in a wireless communications system according to some embodiments.
Figure 7B:
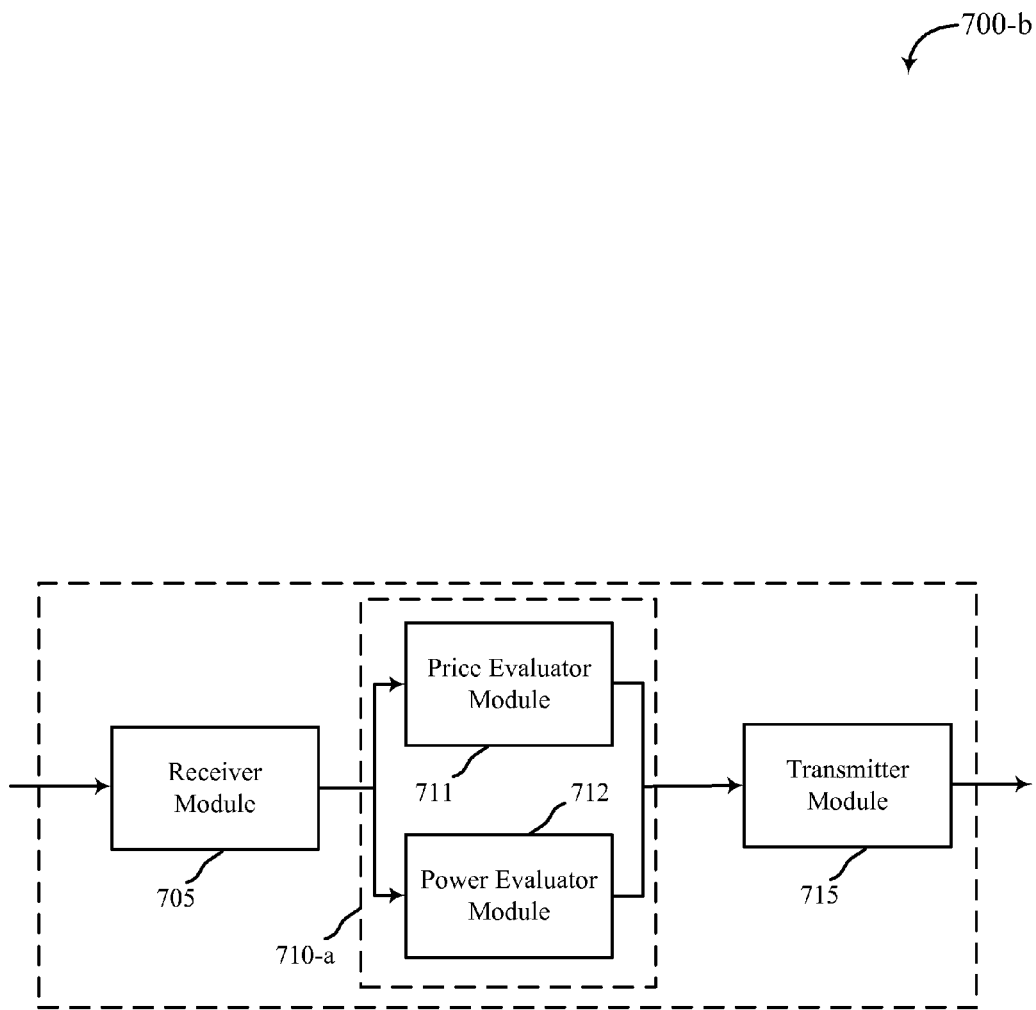

Turning next to FIGS. 7A and 7B, block diagrams illustrate devices 700-*a* and/or 700-*b* for implementing TPRP in accordance with various embodiments. The devices 700-*a* and 700-*b* may be examples of one or more aspects of APs 105 and/or wireless devices 115 described with reference to FIGS. 1, 2A, 2B, 3, 4, 5A, 5B, 6A, 6B, and 6C. The devices 700-*a* and/or 700-*b* may also be processors. The device 700-*a* may include a receiver module 705, an offer selection module 710, and/or a transmitter module 715. The device 700-*b* may include a receiver module 705, an offer selection module 710-*a*, and/or a transmitter module 715. Each of these components may be in communication with each other.

These components of devices 700-*a* and/or 700-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

The receiver module 705 in devices 700-*a* and/or 700-*b* may receive information, including one or more service offers, which may or may not be solicited service offers. The received information may be utilized by the offer selector module 710 for a variety of purposes. For example, the received information may be utilized for selecting a service offer in order to establish a communication service connection to an AP. In device 700-*b*, the offer selector module 710-*a* includes a price evaluator module 711 and a power evaluator module 712. The price evaluator module 711 may evaluate the received information for a price associated with a service offer. The power evaluator module 712 may evaluate the received information to determine a transmission power associated with a service offer. The transmission power may be associated with battery life of the device, as described above, and may be based on the effect of communication on a battery that powers the device 700-*b*. The transmitter module 715 may transmit control information, registration information, service requests, offer acceptance, and/or data.

Figure 8:
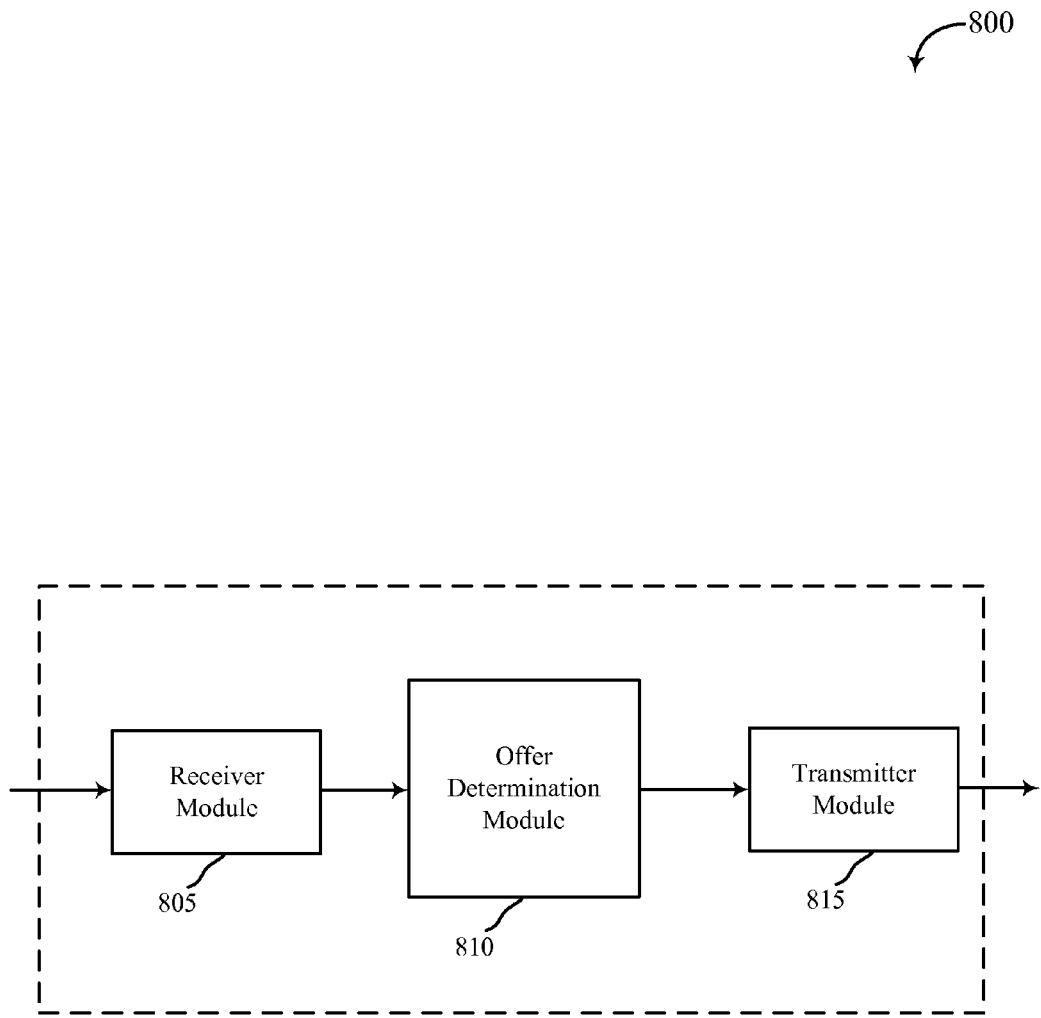
FIG. 8 shows a diagram of a device or devices in a wireless communications system according to some embodiments.

FIG. 8 illustrates a device 800 for implementing TPRP in accordance with various embodiments. The device 800 may be an example of one or more aspects of APs 105 and/or wireless devices 115 described with reference to FIGS. 1, 2A, 2B, 3, 4, 5A, 5B, 6A, 6B, and 6C. The device 800 may also be a processor. The device 800 may include a receiver module 805, an offer determination module 810, and/or a transmitter module 815.

These components of device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

The receiver module 805 in device 800 may receive information, including one or more service requests or bid requests. The received information may be utilized by the offer determination module 810 for a variety of purposes. For example, the received information may be utilized for determining a service offer in order to respond to a service or bid request. The transmitter module 815 may transmit control information, registration information, service offers, offer acceptance acknowledgment, and/or data.

Figure 9:
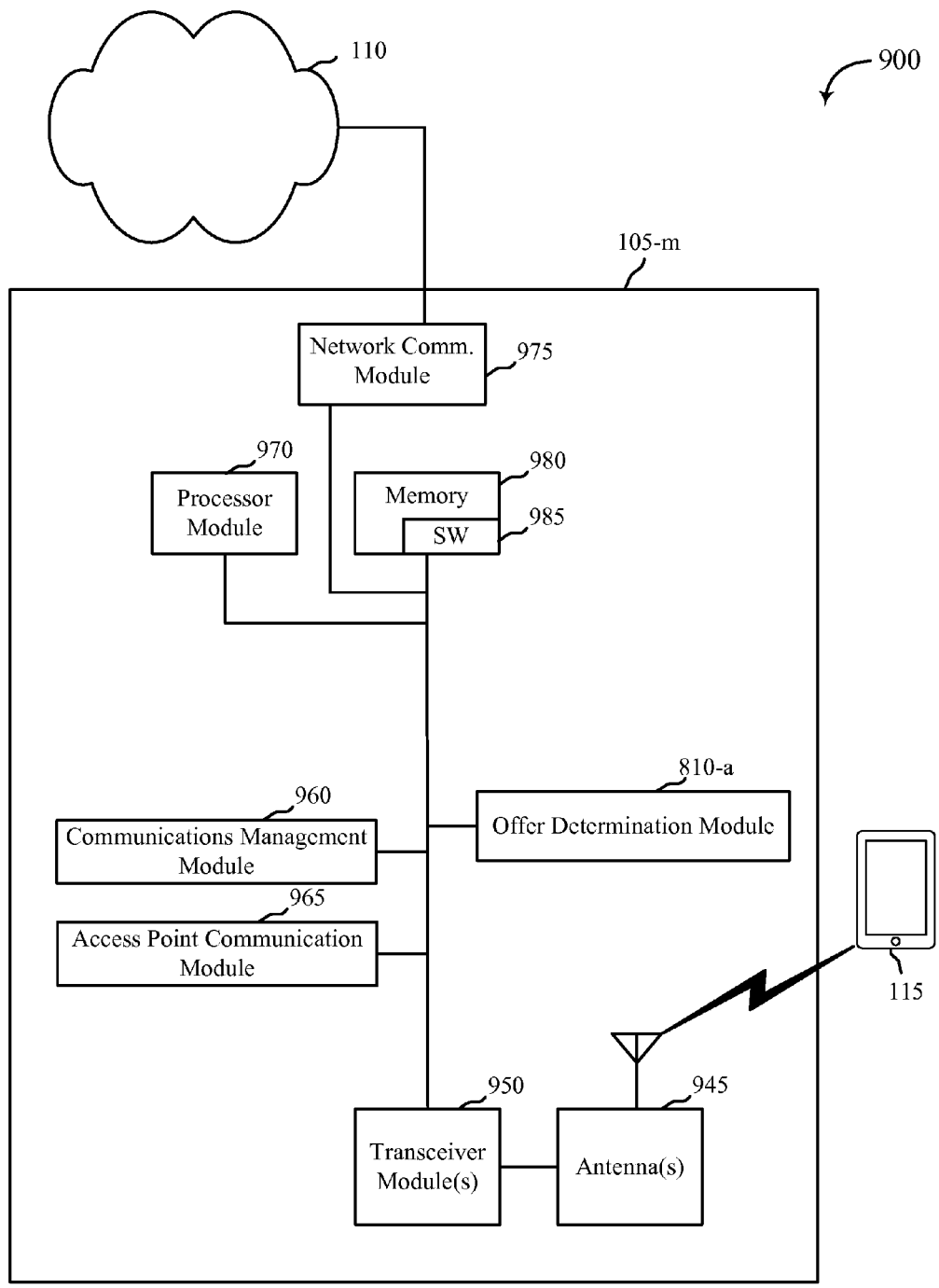
FIG. 9 shows a diagram of a wireless communications system according to some embodiments.

FIG. 9 shows a block diagram of a communications system 900 that may be configured for TPRP. This system 900 may be an example of aspects of the system 100 depicted in FIG. 1, system 200 of FIG. 2A, system 300 of FIG. 3, system 400 of FIG. 4, system 500-*a* of FIG. 5A, systems 600-*a* of FIG. 6A, system 600-*b* of FIG. 6B, system 600-*c* of FIG. 6C, device 700-*a* of FIG. 7A, device 700-*b* of FIG. 7B, and/or device 800 of FIG. 8. System 900 may include an AP 105-*m*. The AP 105-*a* may include antenna(s) 945, a transceiver module 950, memory 980, and a processor module 970, which each may be in communication, directly or indirectly, with each other (e.g., over one or more buses). The transceiver module 950 may be configured to communicate bi-directionally, via the antenna(s) 945, with a wireless device 115. Alternatively or in addition, the transceiver module 950 may be configured to communicate with a wireless device 115 to receive a service request and/or to establish a registration or control communication with the wireless device 115. The transceiver module 950 (and/or other components of the AP 105-*m*) may be configured to communicate bi-directionally with one or more networks. In some cases, the AP 105-*m* may communicate with the core network 110 through network communications module 975. The AP 105-*m* may be an example of an eNodeB base station, a Home eNodeB base station, a NodeB base station, a Home NodeB base station, a WLAN router and/or any other AP that may be TPRP-enabled.

The AP 105-*m* may also communicate with other APs 105. The transceiver module 950 may be configured to communicate with other APs to wheel service requests between APs. The AP 105-*m* may perform and/or facilitate determination of service offers with the offer determination module 810-*a*, which may be an example, or include aspects of the offer determination module 810 of system 800. Determination of a service offer may be in response to a service request, a bid request, or it may be unsolicited.

The memory 980 may include random access memory (RAM) and read-only memory (ROM). The memory 980 may also store computer-readable, computer-executable software code 985 containing instructions that are configured to, when executed, cause the processor module 970 to perform various functions described herein (e.g., call processing, database management, message routing, etc.). Alternatively, the software code 985 may not be directly executable by the processor module 970 but be configured to cause the computer (e.g., when compiled and executed) to perform functions described herein.

According to the architecture of FIG. 9, the AP 105-*m* may further include a communications management module 960. The communications management module 960 may manage communications with other APs 105. The communications management module 960 may facilitate wheeling service requests. In some embodiments, the communications management module 960 may manage paging service by an MVNO AP. By way of example, the communications management module 960 may be a component of the AP 105-*m* in communication with some or all of the other components of the AP 105-*m* via a bus. Alternatively, functionality of the communications management module 960 may be implemented as a component of the transceiver module 950, as a computer-program product or aspects of a non-transitory computer-readable storage medium, and/or as one or more controller elements of the processor module 970.

Figure 10:
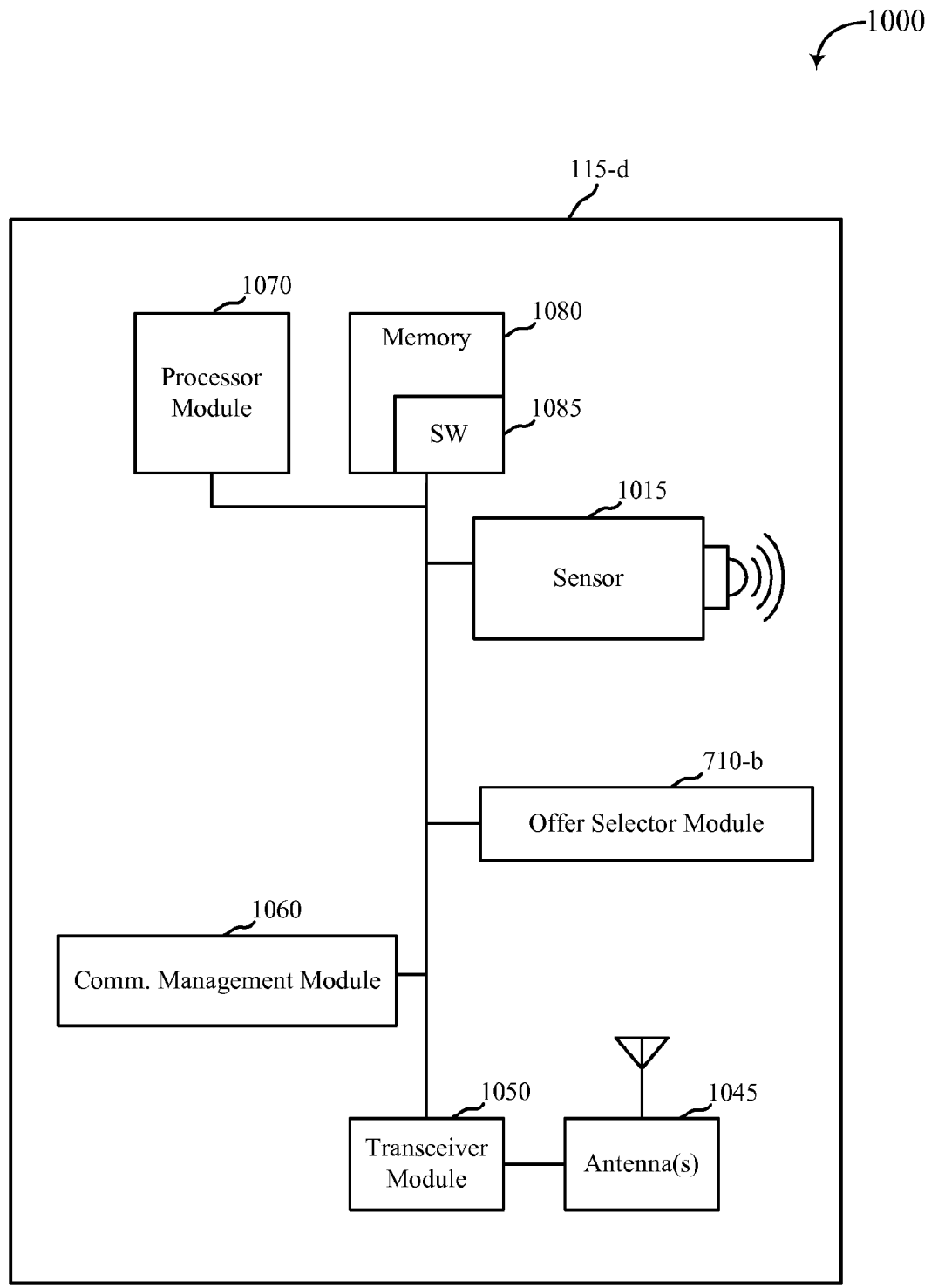
FIG. 10 shows a diagram of a wireless communications system according to some embodiments.

FIG. 10 is a block diagram 1000 of a wireless device 115-*d* configured to implement TPRP in accordance with various embodiments. The wireless device 115-*d* may have any of various configurations, such as a personal computer (e.g., laptop computer, netbook computer, tablet computer, etc.), cellular telephone, PDA, smartphone, digital video recorder (DVRs), internet appliance, gaming console, e-reader, etc.

The wireless device 115-*d* may have an internal power supply (not shown), such as a battery, to facilitate mobile operation. The internal power supply may be referenced, evaluated, and/or considered with a service metric in determining transmission power parameters. The wireless device 115 may be a TPRP-enabled UE. In some embodiments, the wireless device 115 may be the wireless device or UE 115 of FIGS. 1, 2A, 2B, 3, 4, 5A, 5B, 6A, 6B, 6C, and/or 9. The wireless device 115-*d* may include aspects of devices 700-*a* and/or 700-*b* of FIGS. 7A and/or 7B.

The wireless device 115-*d* may include an offer selector module 710-*b*, which may be an example of the offer selector module(s) 710 and/or 710-*a* of devices 700-*a* and/or 700-*b*. The offer selector module 710-*b* may be configured with or may implement a service metric, which may consider and/or evaluate the user-defined service parameters and transmission power discussed above. The wireless device 115-*d* may include antenna(s) 1045, a transceiver module 1050, memory 1080, and a processor module 1070, which each may be in communication, directly or indirectly, with each other (e.g., via one or more buses). The transceiver module 1050 may be configured to communicate bi-directionally, via the antenna(s) 1045 and/or one or more wired or wireless links, with one or more networks, as described above. For example, the transceiver module 1050 may be configured to communicate bi-directionally with APs 105 of FIGS. 1, 2A, 2B, 3, 4, 5A, 5B, 6A, 6B, and/or 6C. In some embodiments, the transceiver module 1050 may be configured to broadcast service requests on multiple frequencies to facilitate TPRP applications with licensed- and unlicensed-spectrum APs, including cellular and WLAN APs. The transceiver module 1050 may include a modem configured to modulate packets and provide the modulated packets to the antenna(s) 1045 for transmission, and to demodulate packets received from the antenna(s) 1045. While the wireless device 115 may include a single antenna 1045, the wireless device 115 may include multiple antennas 1045 for multiple transmission links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., data capture, database management, message routing, etc.). Alternatively, the software code 1085 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc.

According to the architecture of FIG. 10, the wireless device 115-*d* may further include a communications management module 1060. The communications management module 1060 may manage communications with APs 105 and/or other wireless devices 115-*d*. This may include managing service requests and registration to APs, including MVNO APs. By way of example, the communications management module 1060 may be a component of the wireless device 115-*d* in communication with some or all of the other components of the wireless device 115-*d* via a bus. Alternatively, functionality of the communications management module 1060 may be implemented as a component of the transceiver module 1050, as a computer-program product of a non-transitory computer-readable medium, and/or as one or more controller elements of the processor module 1070.

In some embodiments, the transceiver module 1050 in conjunction with antenna(s) 1045, along with other possible components of the wireless device 115-*d*, may transmit information regarding service requests from the wireless device 115 to APs, MVNO APs, or a core network.

Figure 11:
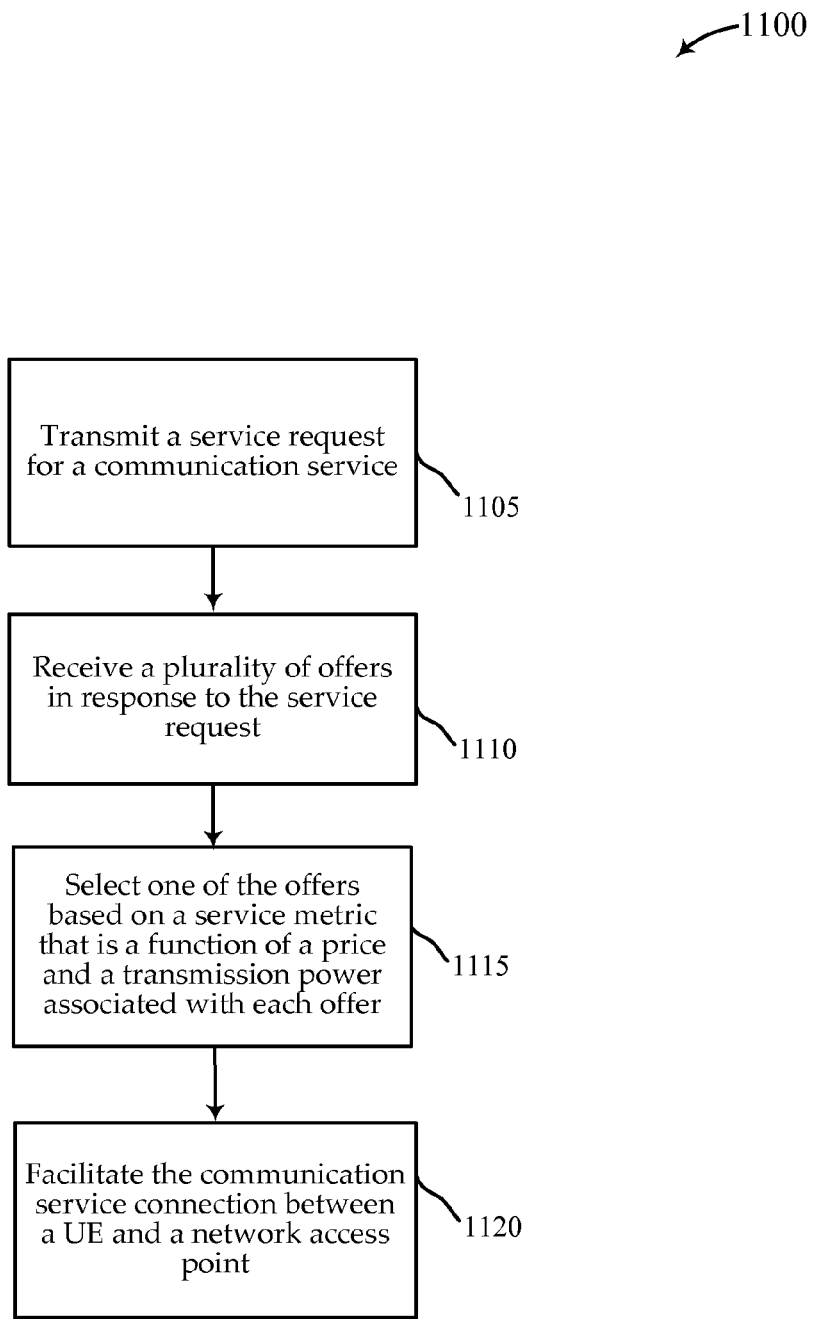
FIG. 11 shows a flowchart of a method or methods of communicating in a wireless communications system according to some embodiments.

Turning now to FIG. 11, which depicts a flow chart illustrating an example of a method 1100 for implementing TPRP. For clarity, the method 1100 is described below with reference to the wireless device 115 shown and referenced in the preceding FIGS. 1, 2A, 2B, 3, 4, 5A, 5B, 6A, 6B, 6C, 7, 8, 9, and 10. In some implementations, the device(s) 700-*a* and/or 700-*b* may execute one or more sets of code(s) to control the functional elements of the wireless device 115 to perform the functions described below.

At block 1105, the wireless device 115 may transmit a service request for communication service. The request may include information about the type of communication the user seeks to transmit or receive (e.g., voice call, text message, Internet browsing, video stream, music file download, etc.), the quantity and/or speed of data the user prefers, and/or preferences regarding the amount of transmission power that may be required for a designated type of communication. At block 1110, the wireless device 115 may receive several offers in response to the service request. Each offer may be associated with a communication service connection to a network access point. The service offers may include terms related to data rates, data quantities, quality of service, reliability of service, transmission power for service, and/or price for service. At block 1115, the wireless device may select one of the offers based on a service metric that is a function of a price and transmission power associated with each offer. The transmission power may be the power required for the wireless device 115 to communicate via the respective communication service connection associated with each offer. The service metric may be a function of the battery life and/or a remaining battery power of the wireless device 115. Alternatively or in addition, the transmission power may be the power required for an access point to communicate via the respective communication service connections associated with each offer. At block 1120, the wireless device 115 or a third party device and/or computer server, which may be an aspect of an MVNO, may facilitate a communication service connection between the wireless device 115 and a network access point.

Figure 12:
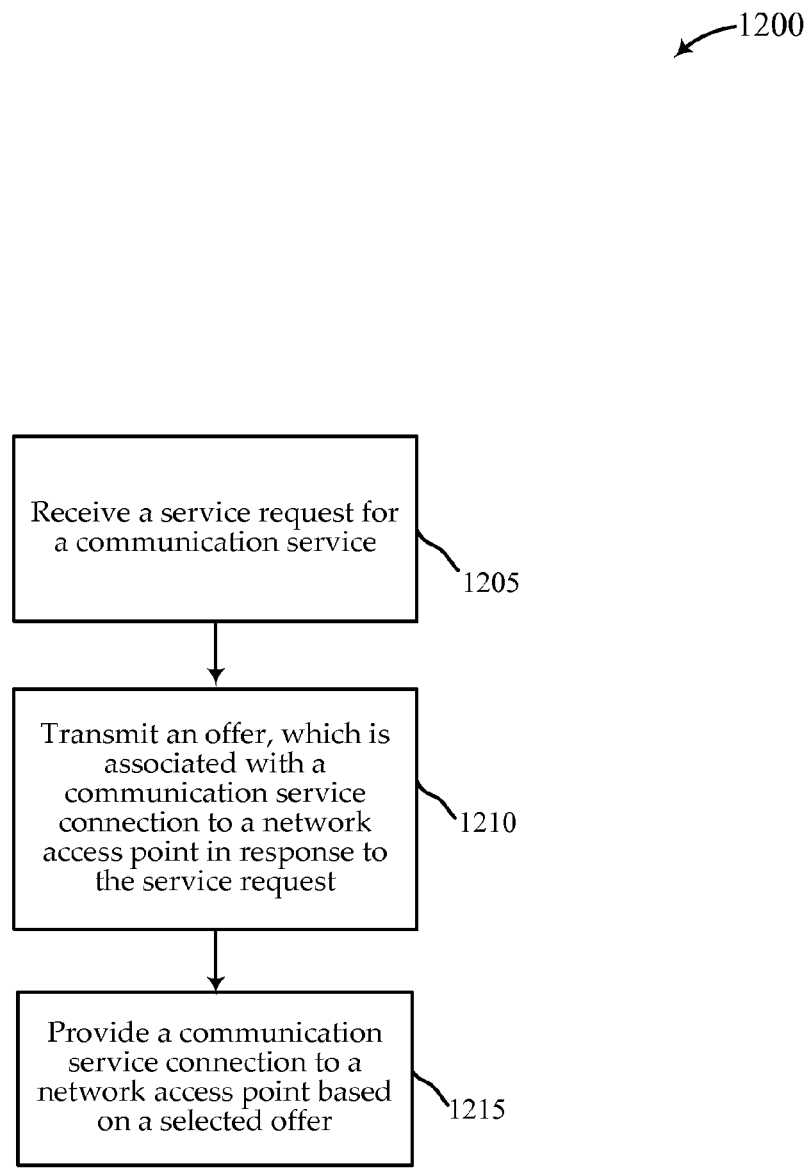
FIG. 12 shows a flowchart of a method or methods of communicating in a wireless communications system according to some embodiments.

FIG. 12 is a flow chart illustrating an example of a method 1200 for implementing TPRP. For clarity, the method 1200 is described below with reference to an AP 105, which may be an AP shown and/or referenced in one or more of the preceding FIGS. 1, 2A, 2B, 3, 4, 5A, 5B, 6A, 6B, 6C, 7, 8, 9, 10, and 11. In some implementations, the device 800 may execute one or more sets of code(s) to control the functional elements of an AP 105 to perform the functions described below.

At block 1205, an AP 105 receives a service request and/or a bid request for a communication service. The request may include information about the type of communication the user seeks to transmit or receive (e.g., voice call, text message, Internet browsing, video stream, music file download, etc.), the quantity and/or speed of data the user prefers, and/or preferences regarding the amount of transmission power that may be required for a designated type of communication. At block 1210, the AP 105 may transmit an offer, which may be associated with a communication service connection to the AP, in response to the service request or bid request. The service offer may include terms related to data rates, data quantities, quality of service, reliability of service, transmission power for service, and/or price for service. The service offer may be based in whole or part on a cost for transmission power based on a current utility rate for electric power. The service offer may be based in whole or part on a channel quality indicator. At block 1215, the AP 105 may provide a communication service connection to the AP, or to a network via the AP, based on a wireless device selecting the service offer.

Figure 13:
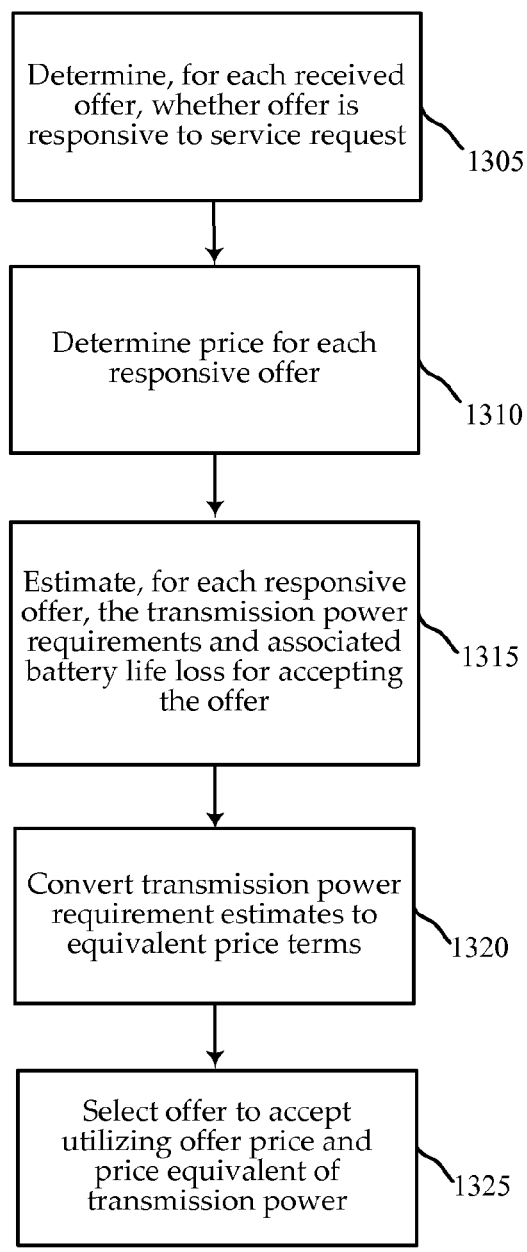
FIG. 13 shows a flowchart of a method or methods of communicating in a wireless communications system according to some embodiments.

FIG. 13 is a flow chart illustrating an example of a method 1300 for implementing TPRP. The method 1300 may be an aspect of the method(s) 1100 and/or 1200. For clarity, the method 1300 is described below with reference to APs 105 and a wireless device 115, which may be shown and/or referenced in the preceding FIGS. 1, 2A, 2B, 3, 4, 5A, 5B, 6A, 6B, 6C, 7, 8, 9, 10, 11, and 12. In some implementations, the device(s) 700-$a$, 700-$b$, and/or 800 may execute one or more sets of code(s) to control the functional elements of an AP 105 and/or a wireless device 115 to perform the functions described below. In some embodiments, the service metric described above may comprise the method 1300.

At block 1305, a wireless device 115 may determine, for each received offer for communication service from an AP 105, whether the offer is responsive to a service request. At block 1310, the wireless device 115 may determine the price, as given in the offer, for each responsive offer. At block 1315, the wireless device 115 may estimate, for each responsive offer, the transmission power requirements and associated battery life loss for accepting the offer. At block 1320, the wireless device 115 may convert the estimated power requirements to equivalent price terms. At block 1325, the wireless device 115 may select an offer utilizing the determined offer price and the converted price term equivalent of the estimated transmission power.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer-program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of accessing a network for wireless communications, the method comprising:

transmitting, by a user equipment (UE), a service request for a communication service, wherein the service request comprises at least one of a requested data rate term or a requested reliability term;

receiving, by the UE, a plurality of offers in response to the service request, each offer associated with a communication service connection to a network access point, wherein each offer comprises a price a user would pay for the communication service connection;

estimating, by the UE and for each offer of the plurality of offers, a transmission power requirement including associated battery life loss of the UE for accepting the offer;

converting, by the UE, each estimated transmission power requirement to an equivalent price term; and selecting, by the UE, one of the offers based on the price the user would pay for each of the respective communication service connections and the equivalent price term.

2. The method of claim 1, further comprising facilitating the communication service connection between the UE and the network access point associated with the selected offer.

3. The method of claim 1, wherein each transmission power requirement comprises power required for the UE to communicate via the respective communication service connections associated with each offer.

4. The method of claim 1, wherein the equivalent price term is based, at least in part, on remaining battery power of a battery of the UE.

5. The method of claim 1, wherein each transmission power requirement comprises power required for an access point to communicate via the respective communication service connections associated with each offer.

6. The method of claim 1, wherein the equivalent price term is based, at least in part, on an initial battery charge state.

7. The method of claim 1, wherein the offers each comprise an offered data-rate term and an offered reliability term.

8. The method of claim 1, wherein the communication service comprises at least one communication type from the group including: Internet access, a voice call, a text message, or email.

9. An apparatus for accessing a network for wireless communications, the apparatus comprising:

a transmitter configured to transmit a service request for a communication service, wherein the service request comprises at least one of a requested data rate term or a requested reliability term;

a receiver configured to receive a plurality of offers in response to the service request, each offer associated with a communication service connection to a network access point, wherein each offer comprises a price a user would pay for the communication service connection;

a power evaluator module configured to estimate for each offer of the plurality of offers a transmission power requirement including associated battery life loss of the apparatus for accepting the offer;

a price evaluator module configured to convert each estimated transmission power requirement to an equivalent price term; and an offer selector configured to select one of the offers based on the price the user would pay for each of the respective communication service connections and the equivalent price term.

10. The apparatus of claim 9, further comprising a processor configured to facilitate the communication service connection between a user equipment and the network access point associated with the selected offer.

11. The apparatus of claim 9, wherein each transmission power requirement comprises power required for a user equipment to communicate via the respective communication service connections associated with each offer.

12. The apparatus of claim 9, wherein the equivalent price term is based, at least in part, on remaining battery power of a battery of the apparatus.

13. The apparatus of claim 9, wherein each transmission power requirement comprises power required for an access point to communicate via the respective communication service connections associated with each offer.

14. The apparatus of claim 9, wherein the communication service comprises at least one communication type from the group including: Internet access, a voice call, a text message, or email.

15. An apparatus for accessing a network for wireless communications, the apparatus comprising:

one or more processors configured for:

transmitting a service request for a communication service, wherein the service request comprises at least one of a requested data rate term or a requested reliability term;

receiving a plurality of offers in response to the service request, each offer associated with a communication service connection to a network access point, wherein each offer comprises a price a user would pay for the communication service connection;

estimating for each offer of the plurality of offers a transmission power requirement including associated battery life loss of the apparatus for accepting the offer;

converting each estimated transmission power requirement to an equivalent price term; and selecting one of the offers based on the price the user would pay for each of the respective communication service connections and the equivalent price term; and memory coupled to the one or more processors.

16. The apparatus of claim 15, wherein the one or more processors are further configured for facilitating the communication service connection between a user equipment and the network access point associated with the selected offer.

17. A computer-program product for accessing a network for wireless communications, comprising a non-transitory computer-readable medium having instructions stored thereon, the instructions being executable by one or more processors and the instructions comprising:

instructions for transmitting a service request for a communication service, wherein the service request comprises at least one of a requested data rate term or a requested reliability term;

instructions for receiving a plurality of offers in response to the service request, each offer associated with a communication service connection to a network access point, wherein each offer comprises a price a user would pay for the communication service connection;

instructions for estimating for each offer of the plurality of offers a transmission power requirement including associated battery life loss for accepting the offer;

instructions for converting each estimated transmission power requirement to an equivalent price term; and instructions for selecting one of the offers based on the price the user would pay for each of the respective communication service connections and the equivalent price term.

18. The computer-program product of claim 17, wherein the instructions further comprise instructions for facilitating the communication service connection between a user equipment and the network access point associated with the selected offer.

* * * * *